United States Patent
Zhang et al.

(10) Patent No.: US 12,298,907 B2
(45) Date of Patent: May 13, 2025

(54) SYSTEMS AND METHODS FOR A REDUNDANT ARRAY OF INDEPENDENT DISKS (RAID) USING A RAID CIRCUIT IN CACHE COHERENT INTERCONNECT STORAGE DEVICES

(71) Applicant: Samsung Electronics Co., Ltd., Suwon-si (KR)

(72) Inventors: Tong Zhang, Mountain View, CA (US); Heekwon Park, San Jose, CA (US); Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 109 days.

(21) Appl. No.: 17/885,519

(22) Filed: Aug. 10, 2022

(65) Prior Publication Data

US 2023/0409480 A1    Dec. 21, 2023

Related U.S. Application Data

(60) Provisional application No. 63/352,629, filed on Jun. 15, 2022.

(51) Int. Cl.
*G06F 12/0817* (2016.01)
*G06F 3/06* (2006.01)

(52) U.S. Cl.
CPC ........ *G06F 12/0828* (2013.01); *G06F 3/0604* (2013.01); *G06F 3/0655* (2013.01); *G06F 3/0689* (2013.01); *G06F 2212/621* (2013.01)

(58) Field of Classification Search
CPC .. G06F 12/0828; G06F 3/0604; G06F 3/0655; G06F 3/0689; G06F 2212/621
See application file for complete search history.

(56) References Cited

U.S. PATENT DOCUMENTS

| | | |
|---|---|---|
| 7,415,506 B2 | 8/2008 | Gajar et al. |
| 7,634,686 B2 | 12/2009 | Sutardja |

(Continued)

FOREIGN PATENT DOCUMENTS

| | | |
|---|---|---|
| CN | 103049222 A | 4/2013 |
| CN | 111538460 A | 8/2020 |

(Continued)

OTHER PUBLICATIONS

McEwan, Alistair A., et al., "An Embedded FTL for SSD Raid," 2015 Euromicro Conference on Digital System Design, 2015, pp. 575-582.

(Continued)

*Primary Examiner* — Prasith Thammavong
(74) *Attorney, Agent, or Firm* — Renaissance IP Law Group LLP

(57) ABSTRACT

A system is disclosed. A first storage device may supporting a cache coherent interconnect protocol, the cache coherent interconnect protocol including a block level protocol and a byte level protocol. A second storage device may also support the cache coherent interconnect protocol. A redundant array of independent disks (RAID) circuit may communicate with the first storage device and the second storage device. The RAID circuit may apply a RAID level to the first storage device and the second storage device. The RAID circuit may be configured to receive a request using the byte level protocol and to access data on the first storage device.

13 Claims, 14 Drawing Sheets

(56) References Cited

U.S. PATENT DOCUMENTS

| | | | |
|---|---|---|---|
| 7,694,072 | B2 | 4/2010 | Nehse |
| 8,452,929 | B2 | 5/2013 | Bennett |
| 8,954,654 | B2 | 2/2015 | Yu et al. |
| 10,896,089 | B2 | 1/2021 | Helmick et al. |
| 11,294,827 | B2 | 4/2022 | Bennett et al. |
| 11,314,580 | B2 | 4/2022 | Chawla et al. |
| 2006/0206661 | A1* | 9/2006 | Gaither ............... G06F 12/0815 711/E12.024 |
| 2008/0301256 | A1* | 12/2008 | McWilliams ....... G06F 12/0806 714/E11.178 |
| 2009/0157958 | A1* | 6/2009 | Maroney ............. G06F 11/2007 711/114 |
| 2013/0019057 | A1 | 1/2013 | Stephens |
| 2016/0378337 | A1* | 12/2016 | Horspool .............. G06F 3/0616 711/103 |
| 2019/0310913 | A1 | 10/2019 | Helmick et al. |
| 2019/0310915 | A1 | 10/2019 | Camp et al. |
| 2020/0034234 | A1 | 1/2020 | Wu |
| 2020/0125503 | A1 | 4/2020 | Graniello et al. |
| 2020/0151104 | A1 | 5/2020 | Yang |
| 2020/0159661 | A1* | 5/2020 | Keymolen .......... G06F 12/0815 |
| 2020/0348866 | A1 | 11/2020 | Gao et al. |
| 2020/0371700 | A1 | 11/2020 | Stabrawa et al. |
| 2020/0401530 | A1* | 12/2020 | Abulila ................ G06F 12/124 |
| 2021/0019069 | A1 | 1/2021 | Sen et al. |
| 2021/0073151 | A1 | 3/2021 | Sen et al. |
| 2021/0081127 | A1* | 3/2021 | Xiao .................... G06F 3/0614 |
| 2021/0081148 | A1* | 3/2021 | Xiao .................... G06F 3/0659 |
| 2021/0081273 | A1 | 3/2021 | Helmick et al. |
| 2021/0278998 | A1 | 9/2021 | Li |
| 2021/0334201 | A1 | 10/2021 | Bennett et al. |
| 2021/0374067 | A1 | 12/2021 | Helmick et al. |
| 2022/0114086 | A1* | 4/2022 | Clark ................... G06F 9/5016 |

FOREIGN PATENT DOCUMENTS

| | | | |
|---|---|---|---|
| CN | 112596673 | A | 4/2021 |
| CN | 113687977 | A | 11/2021 |
| CN | 113687978 | A | 11/2021 |

OTHER PUBLICATIONS

Muppalaneni, Nitin, et al., "A Multi-Tier RAID Storage System with RAID1 and RAID5," Proceedings 14th International Parallel and Distributed Processing Symposium, IPDPS 2000, 2000, 9 pages.

Yao, Jie, et al., "Elastic-RAID: A New Architecture for Improved Availability of Parity-Based RAIDs by Elastic Mirroring," IEEE Transactions on Parallel and Distributed Systems, vol. 27, No. 4, Apr. 2016, pp. 1044-1056.

European Extended Search Report for Application No. 23176343.4, mailed Nov. 7, 2023.

European Extended Search Report for Application No. 23176718.7, mailed Nov. 8, 2023.

Wikipedia, "Compute Express Link," 2022, (https://web.archive.org/web/20220606115649/https://en.wikipedia.org/wiki/Compute_Express_Link), webpage accessed 2023, 6 pages.

Corrected Notice of Allowability for U.S. Appl. No. 17/885,520, mailed Feb. 7, 2024.

Notice of Allowance for U.S. Appl. No. 17/885,520, mailed Jan. 25, 2024.

European Office Action for Application No. 23176343.4, mailed Dec. 23, 2024.

* cited by examiner

SYSTEMS AND METHODS FOR A REDUNDANT ARRAY OF INDEPENDENT DISKS (RAID) USING A RAID CIRCUIT IN CACHE COHERENT INTERCONNECT STORAGE DEVICES

RELATED APPLICATION DATA

This application claims the benefit of U.S. Provisional Patent Application Ser. No. 63/352,629, filed Jun. 15, 2022, which is incorporated by reference herein for all purposes.

The application is related to U.S. patent application Ser. No. 17/885,520, filed Aug. 10, 2022, which claims the benefit of U.S. Provisional Patent Application Ser. No. 63/352,630, filed Jun. 15, 2022, both of which are incorporated by reference herein for all purposes.

FIELD

The disclosure relates generally to storage, and more particularly to supporting a Redundant Array of Independent Disks (RAID) using storage devices supporting a cache coherent interconnect protocol.

BACKGROUND

A Redundant Array of Independent Disks (RAID) may present a set of two or more storage devices as a single storage device. A RAID configuration may support striping (using the storage space of two or more storage devices as though they were a single storage device), parity (providing a mechanism to double check that data is correct), or both. But to utilize the benefits of RAID, access to the data may proceed through a RAID controller (either hardware or software). Bypassing the RAID controller might result in inaccurate data or data corruption.

A need remains for a way to improve access to data from a RAID configuration.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
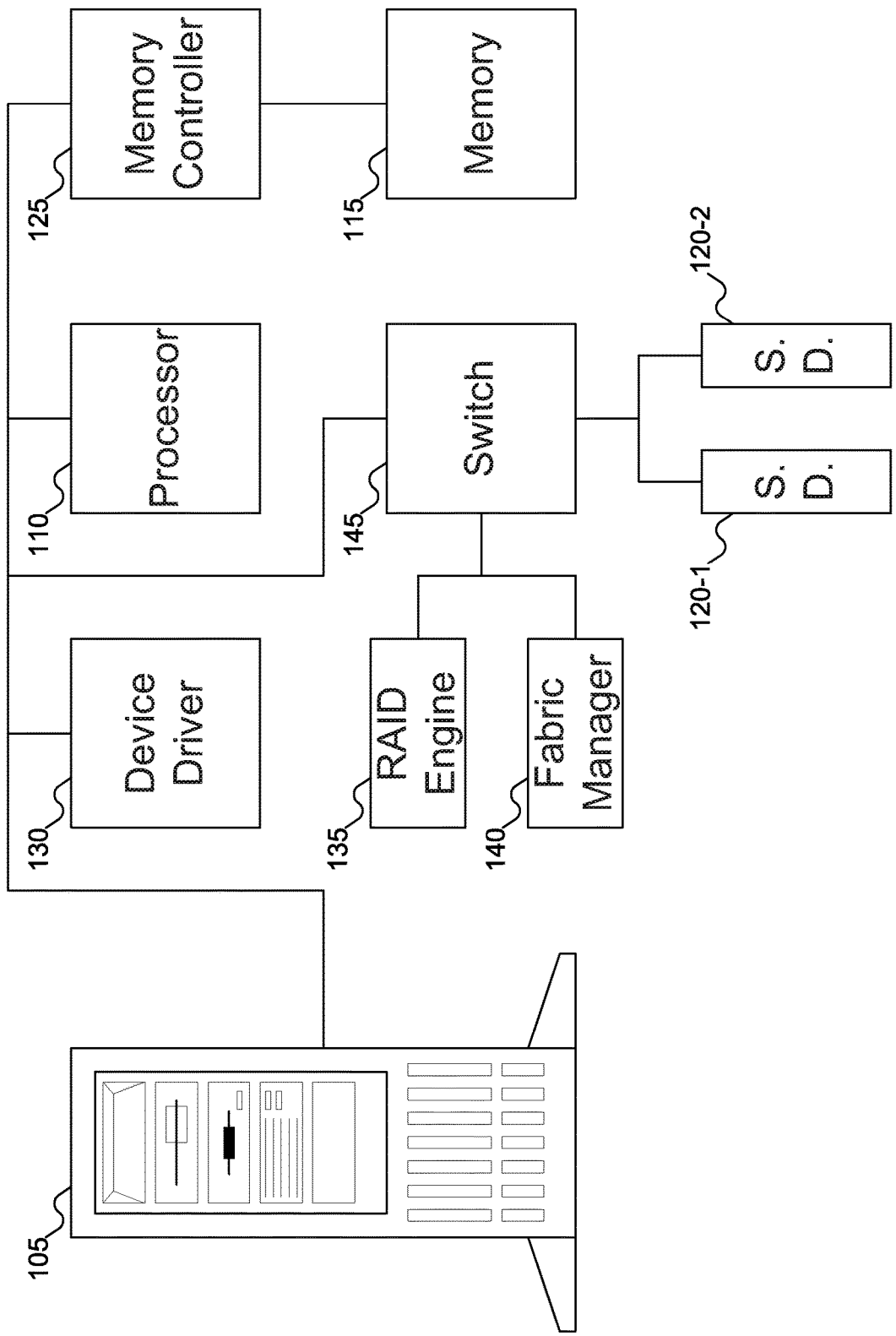
FIG. 1 shows a machine including cache coherent interconnect storage devices that may be configured into a redundant array of independent disks (RAID), according to embodiments of the disclosure.

Embodiments of the disclosure include a system. The system may include two or more storage devices that support a cache coherent interconnect protocol. A switch may connect the two storage devices. A redundant array of independent disks (RAID) engine may manage reading data from and writing data to the storage devices.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices supporting cache coherent interconnect protocols are becoming more common. Such storage devices permit access to data using different protocols, with different levels of granularity. Data may be accessed in blocks, like other storage devices, or in bytes, like memory devices.

A redundant array of independent disks (RAID) enables two or more disks to appear as one larger disk. Different levels of RAID may offer increased storage over individual devices, redundancy to protect against data loss due to a failure of a storage device, or both.

RAID technology might not support byte-level access to data. If an application were to use a byte level protocol to access data on a storage device, such an access might bypass RAID technology. Changing one bit on one storage device in such a manner might result in the data in the RAID array being unreadable, rendering the data stored thereon potentially useless. For example, parity checks for data across the array might no longer be able to detect and/or correct for errors in the data. (While parity data might be able to recover the data if a single bit was changed, if enough bits are changed, error detection and correction might not be possible. And if there is no parity data available, even a single bit error might corrupt the data.)

Embodiments of the disclosure address these problems using a RAID engine. The RAID engine combines the address ranges of the individual storage devices to appear as a single address range. The RAID engine may include a buffer, which may be volatile storage, battery-backed volatile storage, or non-volatile storage. Upon receiving a load request for a particular address, the RAID engine may read the appropriate data from the individual storage devices in the RAID into the buffer, then return the data from the particular address. Upon receiving a store request for a particular address, the RAID engine may load data from the storage devices into the buffer, perform the store request on the data in the buffer, then execute writes to the individual storage devices to commit the updates. The RAID engine may account for any parity, encryption, compression, etc. of the data in this manner, ensuring that the integrity of the RAID configuration is maintained. The RAID engine may also be used in similar manner to handle read and write requests using block level protocols.

The RAID engine may support any desired RAID level.

In addition, when data is written to the RAID storage devices, by storing the data in a buffer, the RAID engine may be able to respond to the host more quickly and handle the writes to the individual storage devices at a later time. The RAID engine may thus enable the host to continue its processing, and may handle the actual write to the storage devices at a convenient time (for example, when the load is low).

Another advantage of using the RAID engine is that, because the data may be distributed across multiple storage devices, store operations may be executed in parallel on multiple storage devices.

FIG. 1 shows a machine including a cache coherent interconnect storage devices that may be configured into a redundant array of independent disks (RAID), according to embodiments of the disclosure. In FIG. 1, machine 105, which may also be termed a host or a system, may include processor 110, memory 115, and storage devices 120-1 and 120-2 (which may be referred to collectively as storage devices 120). Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

In some embodiments of the disclosure, machine 105 may include a persistent memory device (not shown in FIG. 1). This persistent memory device may be used in place of, or in addition to, memory 115.

Processor 110 and memory 115 may also support an operating system under which various applications may be running. These applications may issue requests (which may also be termed commands) to read data from or write data to either memory 115. When storage devices 120-1 and/or 120-2 (which may be referred to collectively as storage devices 120) are used to support applications reading or writing data via some sort of file system, storage devices 120 may be accessed using device driver 130. While FIG. 1 shows two storage devices 120-1 and 120-2, there may be any number of storage devices in machine 105 (although if there is only one storage device 120, a RAID configuration is generally not used). Storage devices 120 may each support any desired protocol or protocols, including, for example, the Non-Volatile Memory Express (NVMe) protocol. Different storage devices 120 may support different protocols and/or interfaces. In particular, storage devices 120 may support a cache coherent interconnect protocol, which may support both block level (or any other higher level of granularity) access and byte level (or any other lower level of granularity) access to data on storage devices 120. An example of such a cache coherent interconnect protocol is the Compute Express Link (CXL) protocol, which supports accessing data in blocks using the cxl.io protocol and accessing data in bytes using the cxl.memory protocol.

FIG. 1 uses the generic term "storage device", and embodiments of the disclosure may include any storage device formats that may support cache coherent interconnect protocols, examples of which may include hard disk drives and Solid State Drives (SSDs). Any reference to "SSD", "hard disk drive", or "storage device" below should be understood to include such other embodiments of the disclosure. Further, different types of storage devices may be mixed. For example, one storage device 120 might be a hard disk drive, and another storage device 120 might be an SSD.

As mentioned above, storage devices 120 may be configured into a RAID. When RAID is used, the underlying hardware—storage devices 120—may be hidden from processor 110. Instead, the RAID configuration shows a "virtual" device that looks like a single storage device, but including storage across the various storage devices 120 that are included in the RAID configuration. (Some storage devices 120 may be part of the RAID and others not: storage devices 120 that are not included in the RAID may be accessed using device driver 130 and conventional access techniques.)

There are a number of different ways to use RAID. These different ways are known as "levels", with different numbers representing the different ways in which storage devices 120 are used. RAID level 0, also known as a stripe set or striped volume, does not actually provide for any redundancy. Instead, data is written across storage devices 120. In embodiments of the disclosure with two storage devices, half of the data is written to storage device 120-1, and half of the data is written to storage device 120-2. The total available storage in a RAID level 0 is typically equal to the size of the smallest storage device multiplied by the number of storage devices in the RAID: mixing storage devices of different sizes may result in some storage not being accessible due to how RAID level 0 operates. RAID level 0 improves performance: since each storage device 120 writes and reads only a portion of the data, each storage device 120 may access its portion in parallel with other storage devices 120 in the RAID, resulting in faster reads and/or writes. But because the data is split across multiple storage devices, the failure of any individual storage device in the system might result in the loss of all data stored.

RAID level 1, also known as mirroring, stores the same data on multiple storage devices. That is, the data stored on storage device 120-1 is also stored on storage device 120-2, and vice versa. The total available space in a RAID level 1 is typically the size of the smallest storage device: including other storage devices in the RAID does not increase the available storage capacity (since the other storage devices are mirrors). Read performance may be improved, since the data may be read from the various storage devices in the RAID. But since write requests result in all the data being written to each storage device, write performance may be unchanged. By keeping two (or more) copies of the data, redundancy is provided. Should any individual storage device 120 fail, the data may be accessed from any other storage device 120 in the RAID.

RAID level 5 offers block-level striping with distributed parity. That is, when data is to be written to a stripe across storage devices 120, the data is written to all but one storage device 120: the last storage device 120 stores parity data based on the data stored on the other storage devices for that stripe. No individual storage device 120 is dedicated to store parity data: parity data may be rotated across all storage devices 120. (Having one storage device 120 be dedicated to storing the parity data is RAID level 4.) RAID level 5 uses at least three storage devices 120: the total available storage is typically the size of the smallest storage device multiplied by one less than the total number of storage devices in the RAID. So, for example, if the RAID includes three 500 GB storage devices, the total available storage space is approximately (3−1)×500 GB=1000 GB=1 TB. Read performance may be improved, since the data may be read from the various storage devices in the RAID (other than the storage device storing the parity information for a stripe). Write performance also may be improved, as data may be written across storage devices 120. However, since the parity information may be generated from data written to other storage devices 120, some additional time may be needed to generated the parity information. In the event that one storage device fails, the lost data may be recalculated using the data from the other storage devices (as the parity information may be used to reconstruct the data from the failed storage device).

RAID level 6 is similar to RAID level 5, except that parity information is stored on two storage devices in the RAID. As such, RAID level 6 uses at least four storage devices, but RAID level 6 may tolerate the failure of two storage devices 120 in the RAID. Total available storage is typically the size of the smallest storage device multiplied by two less than the total number of storage devices in the RAID. So, for example, if the RAID includes four 500 GB storage devices, the total available storage space is approximately (4−1)×500 GB=1000 GB=1 TB. Read and write performance may be similar to RAID level 5.

RAID levels 0, 1, 5, and 6 are among the more common RAID levels, but other RAID levels also exist. In addition, it may be possible to configure storage devices 120 into combinations of these levels. For example, RAID level 10 is a stripe of mirrors. That is, sets of storage devices may be arranged in a RAID level 1 configuration, with a RAID level 0 stripe including the various sets of mirrors. RAID level 10 offers benefits of both mirroring and striping, but at the cost of needing additional storage devices: for example, RAID level 10 uses at least four storage devices, with total capacity being only the size of the smallest storage device multiplied by the number of sets of mirrors used in the stripe.

For purposes of this disclosure, the term "parity information" should be understood as including any form of redundancy of information for the RAID, whether as parity information (as may be used, for example, in RAID levels 5 or 6) or a mirror of data (as may be used, for example, in RAID level 1).

Some RAID implementations may offer the ability to add additional storage devices to the RAID. But whether an additional storage device increases the total available storage may depend on the RAID level being used. For example, adding another storage device to a RAID level 0 may increase storage capacity (but still not offer redundancy), whereas adding another storage device to a RAID level 1 may increase redundancy but not increase the total storage capacity. Adding an additional storage device to RAID levels 5 or 6 may increase the total available storage to some extent. Whether a new storage device may be added to a RAID without shutting down the RAID to add the new storage device may depend on the RAID implementation.

RAID engine 135 may manage the use of storage devices 120 to configure and use a RAID. That is, RAID engine 135 may receive requests to access data from storage devices 120, determine where the data is actually stored on storage devices 120, read or write the data, handle error correction (for example, using parity information), and so on. RAID engine 135 may be implemented as hardware, and may also be termed a RAID circuit.

Fabric manager 140 may be used to initialize RAID engine 135. For example, fabric manager 140 may determine what RAID level is to be used, identify what storage devices 120 are available, and perform other operations involved in initializing the RAID for machine 105. Fabric manager 140 is discussed further with reference to FIGS. 5 and 9-11 below.

In some embodiments of the disclosure, RAID engine 135 may be directly connected to, or in direct communication with, storage devices 120. But in some embodiments of the disclosure, switch 145 may act as an intermediary between processor 110, RAID engine 135, fabric manager 140, and/or storage devices 120. Switch 145 may be responsible for ensuring that data that is intended to go from one component in machine 105 to another is routed correctly to reach its intended destination. As switch 145 may be communicating with cache coherent interconnect protocol storage devices 120, switch 145 may be a cache coherent interconnect protocol switch. Further, as switch 145 may be communicating with RAID engine 135, switch 145 may be a RAID-aware switch.

While FIG. 1 shows RAID engine 135 and fabric manager 140 as external to switch 145, in some embodiments of the disclosure switch 145 may include either or both of RAID engine 135 and fabric manager 140.

Not shown in FIG. 1 is a circuit board. This circuit board, which may be a motherboard, backplane, or midplane, may include slots into which processor 110, memory 115, storage devices 120, RAID engine 135, fabric manager 140, and/or switch 145 may be installed. Note that depending on the implementation, one or more of these components may be installed directly onto the circuit board, rather than being installed in slots. In addition, embodiments of the disclosure may include multiple circuit boards that interconnect, with the components installed across these circuit boards.

Figure 2:
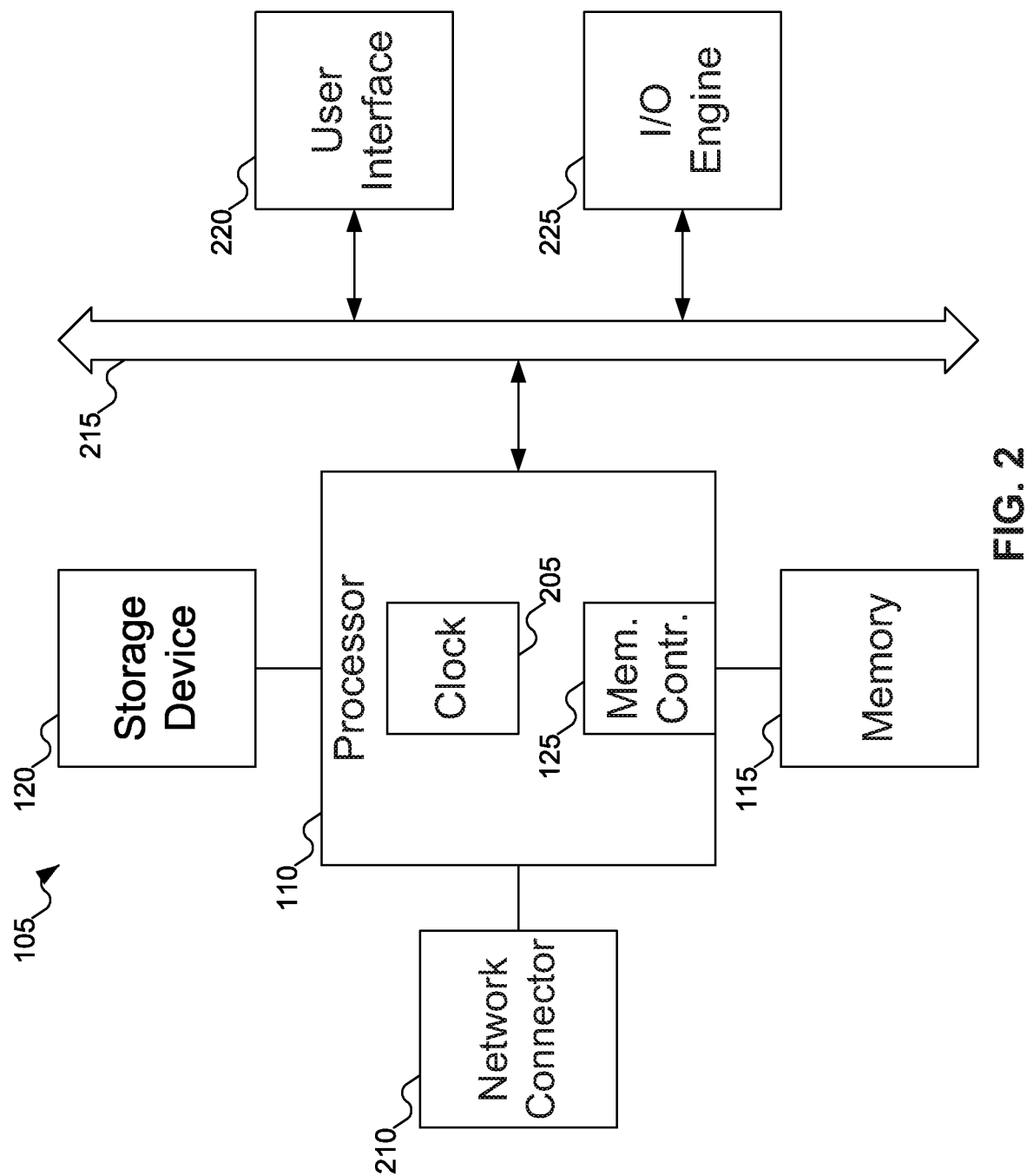
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
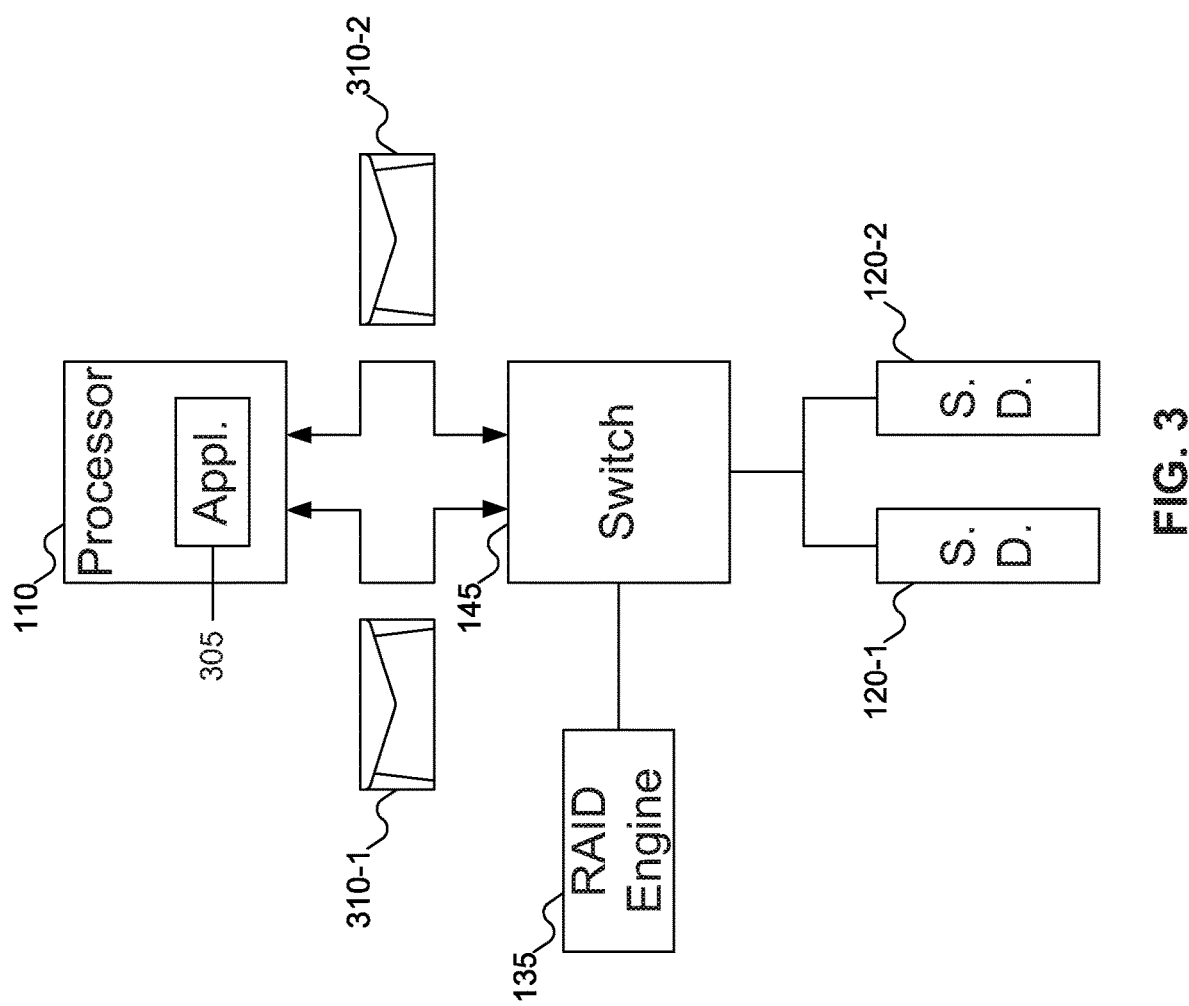
FIG. 3 shows the use of the RAID of FIG. 1, according to embodiments of the disclosure.

FIG. 3 shows the use of the RAID of FIG. 1, according to embodiments of the disclosure. In FIG. 3, processor 110 may be executing application 305. (In some embodiments of the disclosure, processor 110 may be executing multiple threads, from multiple applications, the operating system, or other sources.) Application 305 may send requests, such as requests 310-1 and 310-2 (which may be referred to collectively as requests 310) to access data from storage devices 120. (In this disclosure, the term "access" is intended to describe reading data from storage devices 120, writing data to storage devices 120, or performing any other operations within storage device 120, particularly that involve data stored on storage devices 120.) Requests 310 may be received at switch 145, which may forward the requests to RAID engine 135. RAID engine 135 may determine exactly how to access the data on storage devices 120 and may issue the commands appropriate for the RAID level that has been implemented.

In some embodiments of the disclosure, machine 105 of FIG. 1 may include a compute module, such as an accelerator designed to execute various functions. If such a compute module is included in machine 105, in some embodiments of the disclosure the compute module may also communicate with RAID engine 135 to access data from storage devices 120, so that the compute module does not need to know how the data is stored on storage devices 120 (and in particular, how to access data from storage devices 120 based on the RAID level being implemented).

Figure 4:
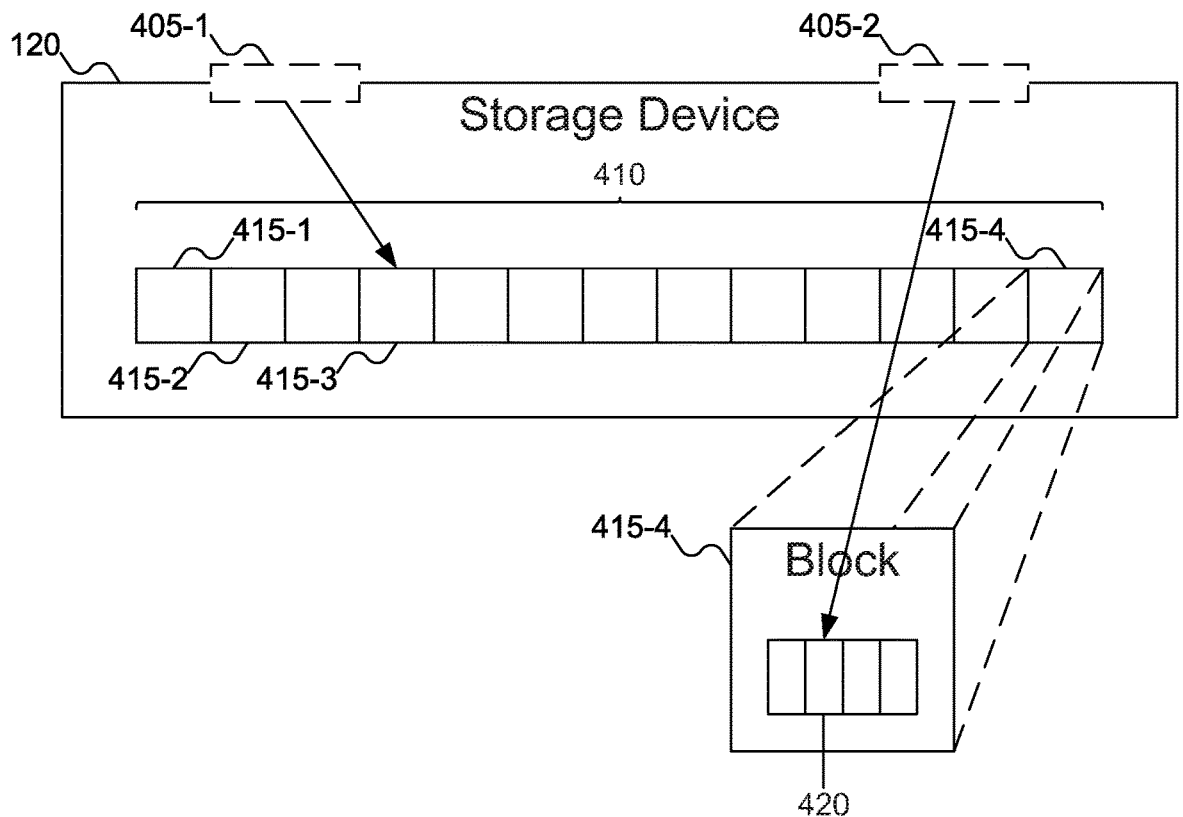
FIG. 4 shows how data may be accessed from the storage devices of FIG. 1 using two different protocols, according to embodiments of the disclosure.

As mentioned above, storage devices 120 may support a cache coherent interconnect protocol, which may support both block level and byte level access to data on storage devices 120. That is, applications may read data from storage devices 120 by issuing either read requests to read a block (sector, or other equivalent concept) from storage devices 120, or load requests to read a particular byte (or a set of bytes) starting at a particular byte address on storage devices 120. Similarly, applications may write data to storage devices 120 by issuing either write requests to write a block to storage devices 120, or store requests to write data to a particular byte (or a set of bytes) starting at a particular address on storage devices 120. In this disclosure, read and write requests may be handled as block level requests, such as to access data from a file on storage devices 120, and load and store requests may be handled as byte level requests, such as to access a byte from memory 115 of FIG. 1. FIG. 4 illustrates these different forms of access.

In FIG. 4, block level protocol 405-1 may be used to execute block level requests, and byte level protocol 405-2 may be used to execute byte level requests. Block level protocol 405-1 and byte level protocol 405-2 may be referred to collectively as protocols 405. Note that FIG. 4 is not intended to suggest that there are different physical ports or interfaces on storage device 120 used for these various requests: all requests may pass through the same physical connection, interface and/or port of storage device 120. FIG. 4 is only intending to suggest that storage device 120 may process these requests differently, depending on which protocol 405 is used.

Storage device 120 may offer overall storage 410. Storage 410 may be divided into blocks. For example, storage device 120 may include blocks 415-1 through 415-4 (which may be referred to collectively as blocks 415). In some embodiments of the disclosure, blocks 415 may be divided into pages, with the page being the smallest unit of data that may be accessed using block level protocol 405-1. But when data is erased from storage device 120, the smallest unit of data that may be erased might be a block. Thus, it is convenient to discuss accessing data from storage device 120 in terms of blocks, since the block may be the smallest unit of storage for which all possible commands may be issued. Embodiments of the disclosure may include storage 410 divided into units other than blocks (for example, pages), depending on how storage device 120 may function.

Application 305 of FIG. 3 may issue read or write requests 310-1 of FIG. 1 to read or write data a block (or page, which identifies a block to be accessed) at a time. So, for example, FIG. 4 shows block level protocol 405-1 being used to access data from block 415-3. Together, blocks 415 may represent the available storage of storage device 120.

But as storage device 120 may support a cache coherent interconnect protocol, byte level protocol 405-2 may also be used, to access individual bytes of data on storage device 120. Storage device 120 may expose an address range that may appear to application 305 of FIG. 3 to be merely an extension of the memory exposed by memory 115 of FIG. 1. Thus, application 305 of FIG. 3 may issue commands to load or store data in specific bytes within storage device 120. For example, FIG. 4 shows byte level protocol 405-2 being used to access byte 420 within block 415-4.

As discussed above, typically the block or page is the smallest unit of data that may be accessed within storage device 120. To enable access to individual bytes using byte level protocol 405-2, storage device 120 may include another form of memory, such as DRAM. When a request using byte level protocol 405-2 is received, storage device 120 may check to see if the requested address is already loaded somewhere into this memory. If not, storage device 120 may read the block from the storage medium and store the data in the memory. (This memory may be smaller than the total available storage of storage device 120: if necessary, storage device 120 may also flush data from this memory back to the storage medium, to make room for the data to be loaded into this memory.) Storage device 120 may then access the particular byte address identified in the request using byte level protocol 405-2 from this memory.

This other form of memory may be either volatile or non-volatile storage, and may be either persistent or not, depending on the embodiment of the disclosure. If volatile memory is used, then storage device 120 may need to include some backup power source to protect against a power interruption or storage device 120 may need to ensure that store commands are committed to the non-volatile storage medium immediately.

Typical RAID implementations process requests to read and write data from storage devices; typical RAID implementations do not process memory requests. Therefore, any requests that use byte level protocol 405-2 might not result in correct data processing. A load request might result in the wrong data being returned (for example, if the byte address attached to the load request actually stores parity information for a RAID 5 configuration, the data that might be returned is not actually data that had been written by application 305 of FIG. 3); a store request might actually introduce errors into the data stored on storage devices 120 of FIG. 1. Using a RAID level 1 configuration, it might not be possible to determine which storage device 120 stores the correct data, only to detect that there is some sort of error. Even using parity information in RAID levels 5 or 6 configurations might not guard against problems: if enough such requests are issued, it might not be possible for RAID engine 135 of FIG. 1 to determine the correct data. Thus, when using storage device 120 supporting both block level protocol 405-1 and byte level protocol 405-2, RAID engine 135 may need to intercept requests that look like they access memory but are actually accessing storage devices 120 of FIG. 1.

Figure 5:
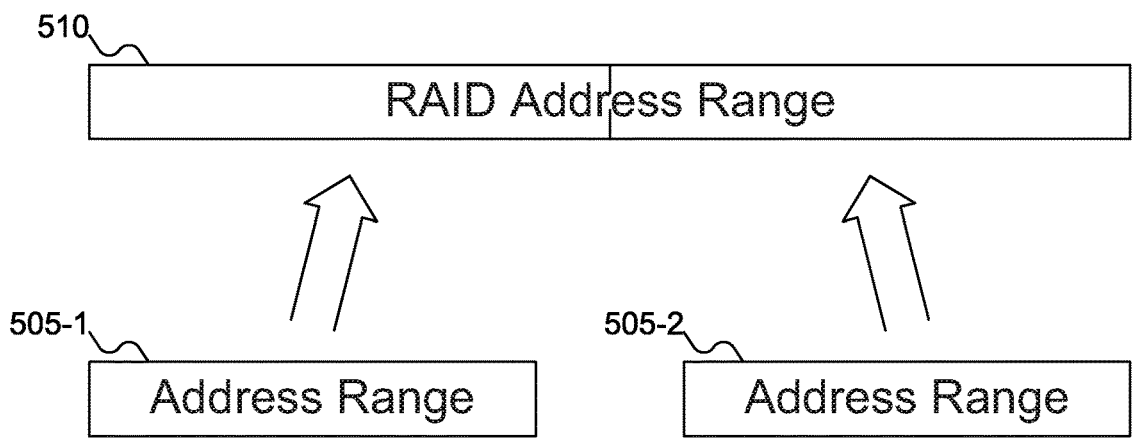
FIG. 5 shows how a RAID address range may map to individual address ranges of the storage devices of FIG. 1, according to embodiments of the disclosure.

To be able to intercept memory requests that actually access data on storage devices 120 of FIG. 1, RAID engine 135 of FIG. 1 may establish an address range that represents the available storage on storage devices 120 of FIG. 1. This RAID address range may then be registered with the system instead of the individual address ranges for storage devices 120 of FIG. 1. In this manner, RAID engine 135 of FIG. 1 may hide the address ranges of storage devices 120 of FIG. 1. FIG. 5 illustrates how this may be done.

FIG. 5 shows how a RAID address range may map to individual address ranges of storage devices 120 of FIG. 1, according to embodiments of the disclosure. During RAID initialization, fabric manager 140 of FIG. 1 may determine address ranges 505-1 and 505-2 exposed by each storage device 120 of FIG. 1 (address ranges 505-1 and 505-2 may be referred to collectively as address ranges 505). Fabric manager 140 of FIG. 1 may then generate RAID address range 510, which may be large enough to include the address ranges of the individual storage devices. Any address in address range 510 may have a corresponding address in one of address ranges 505, and vice versa. Fabric manager 140 of FIG. 1 may then register RAID address range 510 with the system (for example, by adding RAID address range 510 to a memory map or system memory of machine 105 of FIG. 1). If address ranges 505 for storage devices 120 of FIG. 1 were separately registered with the system, fabric manager 140 of FIG. 1 may also deregister address ranges 505 from the system, so that application 305 of FIG. 3 may not attempt to access byte addresses in storage devices 120 of FIG. 1 using byte level protocol 405-2 of FIG. 4.

While FIG. 5 suggests that RAID address range 510 includes a contiguous block of addresses that correspond to individual address ranges 505, embodiments of the disclosure may include other ways to manage how addresses in RAID address range 510 might correspond to addresses in address ranges 505. For example, addresses in address ranges 505 might interleave in RAID address range 510.

Figure 6:
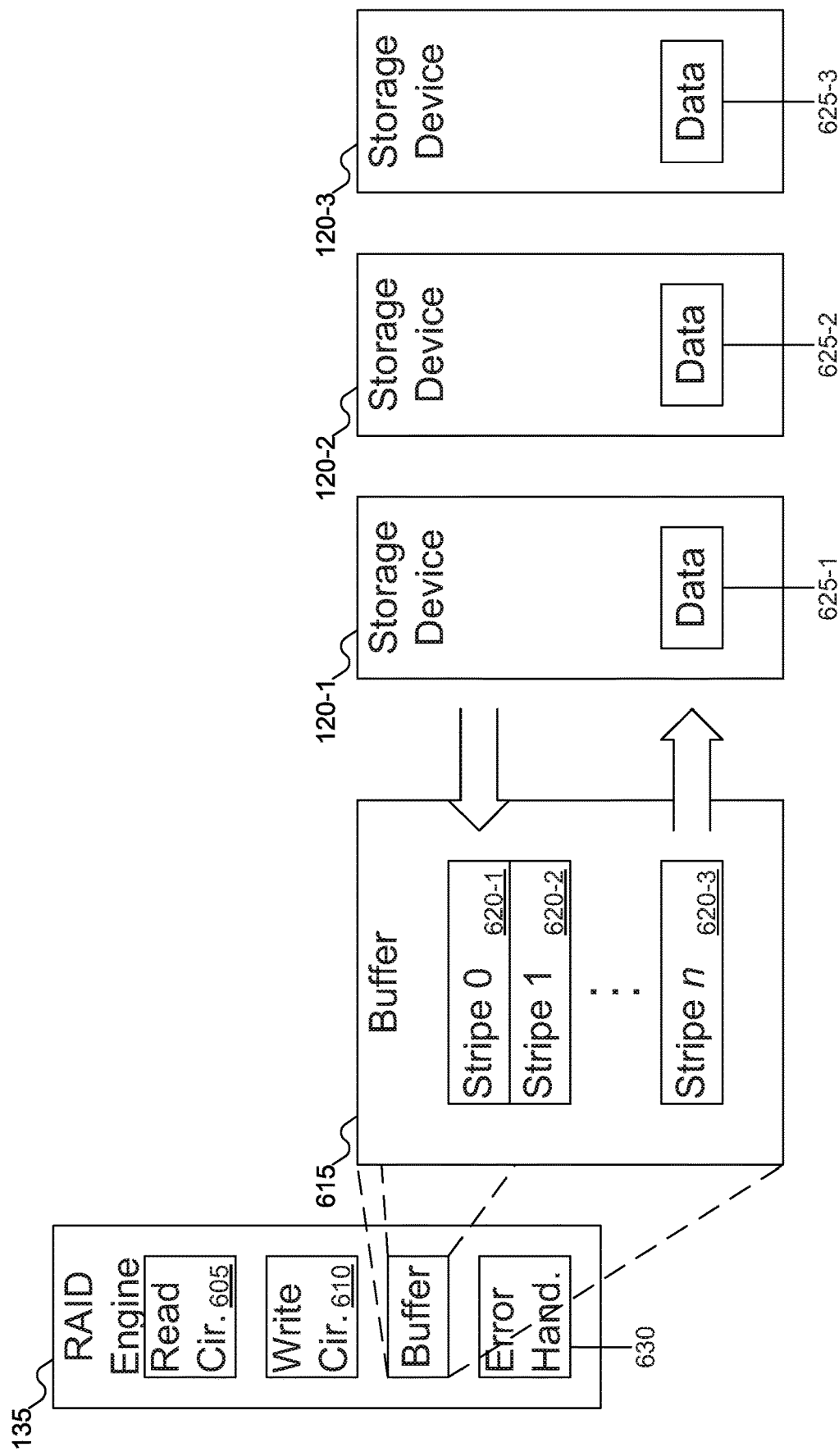
FIG. 6 shows details of a buffer in the RAID engine of FIG. 1, according to embodiments of the disclosure.

FIG. 6 shows details of a buffer in RAID engine 135 of FIG. 1, according to embodiments of the disclosure. In FIG. 6, RAID engine 135 may include various components. RAID engine 135 is shown as including read circuit 605, write circuit 610, and buffer 615. Read circuit 605 may read data from storage devices 120, using block level protocol 405-1 of FIG. 4. Similarly, write circuit 610 may write data to storage devices 120, using block level protocol 405-1 of FIG. 4.

Buffer 615 may be used to manage access to data when application 305 of FIG. 3 issues load or store requests using byte level protocol 405-2 of FIG. 4. Based on the existence of a byte address in RAID address range 510 of FIG. 5, RAID engine 135 may determine that the request accesses data on one of storage devices 120. RAID engine 135 may load data into buffer 615. In essence, buffer 615 is the equivalent of the memory used by the storage device to handle requests that use byte level protocol 405-2 of FIG. 4, but used by RAID engine 135 instead. Buffer 615 may be volatile memory or non-volatile memory; buffer 615 may be persistent or not. As with the memory used by storage devices 120 to handle requests using byte level protocol 405-2 of FIG. 4, if buffer 615 is not non-volatile or persistent memory, RAID engine may include a backup power source (not shown in FIG. 6), such as a battery or a capacitor, to provide enough power to flush data in buffer 615 back to storage devices 120 in case of a power interruption.

Buffer 615 may store data in stripes 620-1 through 620-3 (which may be referred to collectively as stripes 620). Each stripe may include a portion of data from each storage device. Stripes 620 may parallel how RAID engine 135 stores the data on storage devices 120. For example, if a RAID level 0 configuration is used, the data in stripes 620 from each storage device 120 may be read and loaded into buffer 615; if a RAID level 1 configuration is used, the data in stripes 620 may include the data from one of storage devices 120 (with the data in the remaining storage devices 120 used to verify and correct for any errors in the data loaded into stripes 620); if a RAID level 5 configuration is used, the data in stripes 620 may include the non-parity data from storage devices 120 (with the parity information being used to verify and correct for any errors in the data loaded into stripes 620), and so on.

RAID engine 135 may identify what stripe 620 stores the requested data based on the byte address provided with the request. If stripe 620 is not currently loaded into buffer 615, then RAID engine 135 may read the stripe from across storage devices 120 and store the data in stripes 620. RAID engine 135 may then access the individual byte(s) based on the request from buffer 615 and return that data to application 305 of FIG. 3.

As with the memory that storage device 120 might use to handle requests using byte level protocol 405-2 of FIG. 4, buffer 615 may be smaller than the total available storage of storage devices 120 using the RAID level configuration. In some embodiments of the disclosure, buffer 615 may use any desired technique to decide what stripe 620 to evict to make room for new data. For example, buffer 615 may use a least recently used (LRU) algorithm, a least frequently used (LFU) algorithm, or any other desired algorithm to select what stripe 620 to evict from buffer 615 to make room for new data.

FIG. 6 shows stripe 620-3 being evicted to make room for stripe 620-1. The data in stripe 620-3 may be divided into portions, with each portion to be stored on a different storage device 120. For example, stripe 620-3 may be divided into data 625-1, 625-2, and 625-3 (which may be referred to collectively as data 625), to be written to storage devices 120-1, 120-2, and 120-3, respectively. Data 625 may be actual data or may be parity information generated appropriately from the data in stripe 620-3. In case a RAID configuration including mirroring (such as RAID level 1) is used, each data 625 might not be unique.

Once the data in stripe 620-3 has been written to storage devices 120, data (such as data 625) may be loaded into stripe 620-1. Essentially, the operations of evicting stripe 620-3 and loading stripe 620-1 are mirrors of each other: data is written or read, and parity information or other redundancy information is written or used to verify that the data that was read is correct.

Note that the eviction of stripe 620-3 might not need to include writing the data to storage devices 120. For example, if the data in stripe 620-3 is already stored as a stripe across storage devices 120, then evicting stripe 620-3 might only involve deleting stripe 620-3 from buffer 615. (Note that the term "deleting" may be broadly understood as actually erasing the data from stripe 620-3, marking the data in stripe 620-3 as invalidated (but not actually erasing the data from stripe 620-3), or otherwise indicating that stripe 620-3 is available to store new data, whether or not the data currently in stripe 620-3 is actually somehow removed from buffer 615.)

While FIG. 6 suggests that data is loaded into stripe 620-1 in buffer 615 and evicted from stripe 620-3 in buffer 615, embodiments of the disclosure may include evicting data from and/or loading data into any stripe 620 in buffer 615. For example, buffer 615 might include a table (not shown in FIG. 6) that tracks information about the access of stripes 620: this information may then be used to select which stripe 620 to evict and/or which stripe 620 to load data. There is no requirement that stripe 620-1 always be used to load data or that data in stripe 620-3 always be evicted.

As discussed above, RAID engine 135 may write out parity information to one or more of storage devices 120. Error handler 630 may generate the appropriate parity information to be written to storage devices 120. For example, assume that machine 105 of FIG. 1 is configured to use a RAID level 5 configuration. That means that when a stripe (such as stripe 620-3) is stored on storage devices 120, two storage devices 120 may receive actual data, and the third storage device 120 may store parity information. In this manner, one the data on one storage device 120 becomes corrupted, or one storage device 120 should fail, the stripe may be reconstructed using the parity information. So, assume that for stripe 620-3, data 625-1 and 625-2 are the actual data, and data 625-3 is the parity information. Error handler 630 may generate the parity information for data 625-3 based on data 625-1 and 625-2 to write stripe 620-3 to storage devices 120.

While the above discussion focuses on generating parity information, embodiments of the disclosure may extend to any desired form of error handling. For example, if the RAID level implemented using machine 105 of FIG. 1 includes mirroring of data, error handler 630 may copy some data to the mirror drive.

Note that error handler 630 may also perform error correction. For example, assume that at some point data 625 are being loaded into stripe 620-1. Read circuit 605 may read data 625, and error handler 630 may use the parity information in (for example) data 625-3 to verify that data 625-1 and 625-2 are correct. If error handler 630 determines that there is an error somewhere (which could be in any of data 625), error handler 630 may attempt to correct for the error before data stripe 620-1 is considered loaded into buffer 615. In this manner, error handler 630 may also support correcting errors when data is being accessed.

Figure 7:
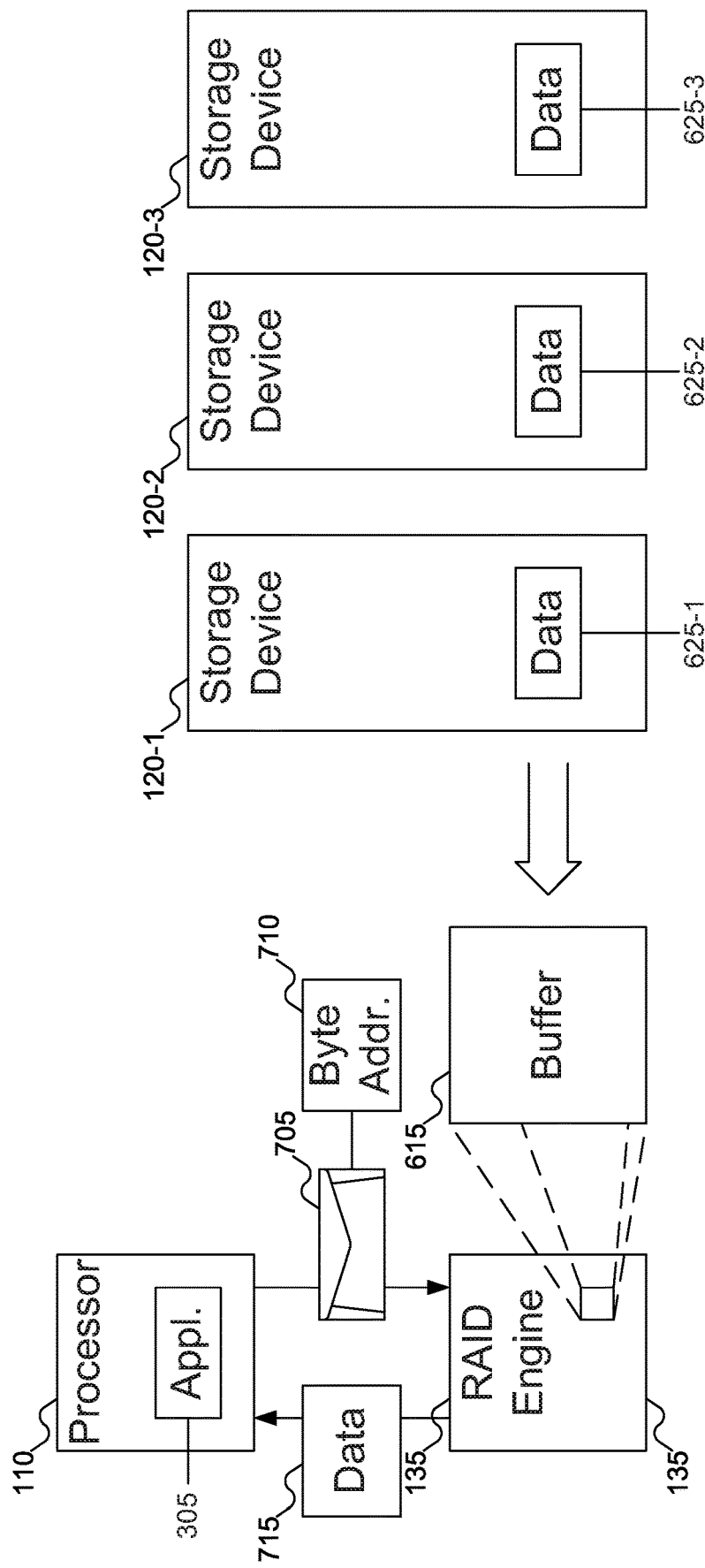
FIG. 7 shows how a load request may be handled by the RAID engine of FIG. 1, according to embodiments of the disclosure.

FIG. 7 shows how a load request may be handled by RAID engine 135 of FIG. 1, according to embodiments of the disclosure. In FIG. 7, application 305 may send load request 705. Load request 705 may include byte address 710, specifying which byte address stores the data being requested. Byte address 710 should be understood as representing any possible form that identifies a particular address, as well as any possible size of data to be loaded. Thus, for example, byte address 710 might specify a particular address directly and indicate that one byte is to be loaded. Or, byte address 710 might include a base address for a block (or an identifier that may be mapped to the base address for that block), plus an offset from that base address, and a number of bytes to be loaded.

When RAID engine 135 receives load request 705, RAID engine 135 may determine if the stripe containing byte address 710 is currently loaded in buffer 615. If not, then RAID engine 135 may use read circuit 605 to read the stripe from storage devices 120 into buffer 615. If buffer 615 was previously full, RAID engine 135 may select a stripe to evict from buffer 615, as described with reference to FIG. 6 above.

As discussed with reference to FIG. 6 above, error handler 630 of FIG. 6 may be used to verify that data is correct when a stripe is loaded into buffer 615. If data 625, when read by read circuit 605 of FIG. 6, includes errors, error handler 630 of FIG. 6 may attempt to correct those errors before the stripe is fully loaded into buffer 615 (or may report a read failure if the error may not be corrected).

Once the stripe containing byte address 710 has been loaded into buffer 615, RAID engine 135 may access the data from the stripe in buffer 615. RAID engine may then return data 715 back to application 305.

Figure 8:
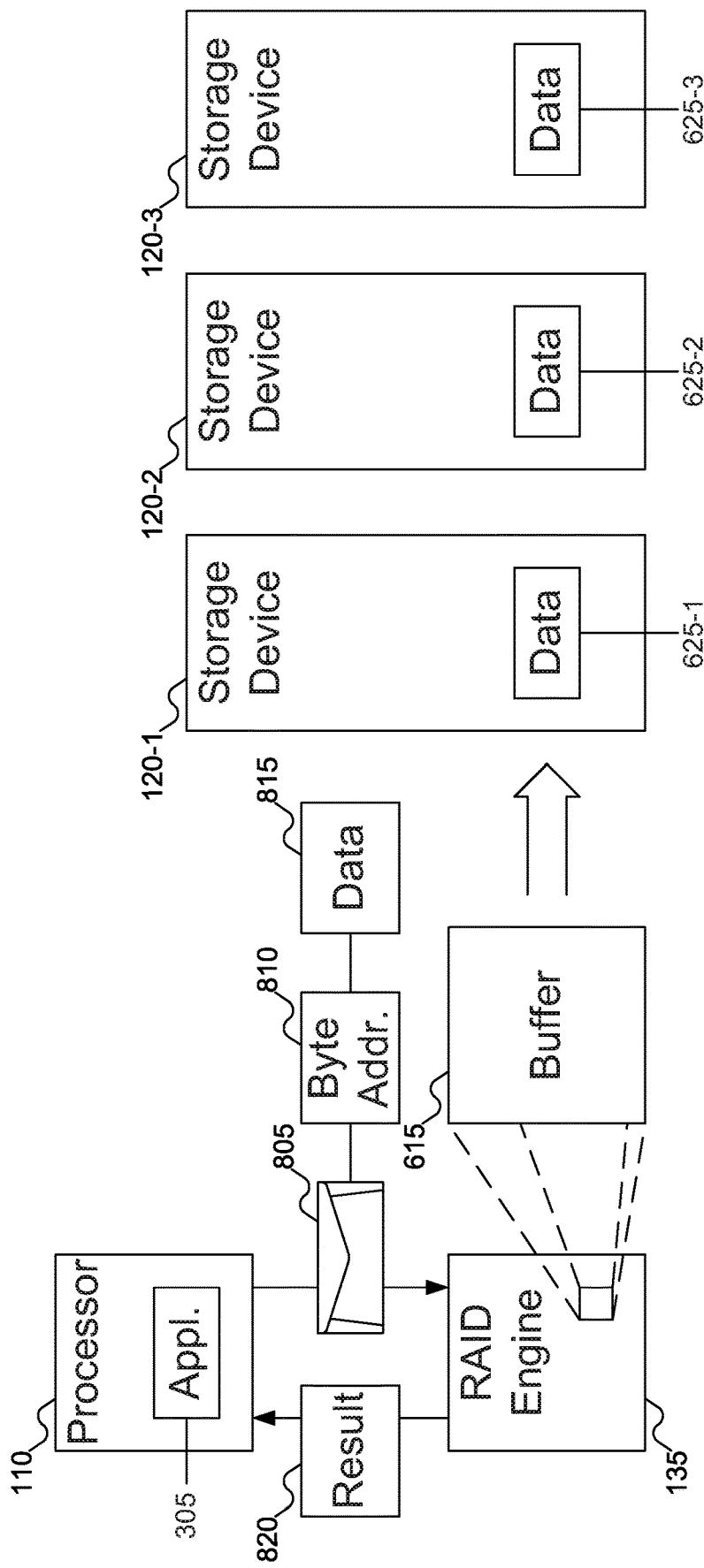
FIG. 8 shows how a store request may be handled by the RAID engine of FIG. 1, according to embodiments of the disclosure.

FIG. 8 shows how a store request may be handled by RAID engine 135 of FIG. 1, according to embodiments of the disclosure. In FIG. 8, application 305 may send store request 805. Store request 805 may include byte address 810, specifying which byte address stores the data being requested, and data 815 to be stored. As with byte address 710 of FIG. 7, byte address 810 should be understood as representing any possible form that identifies a particular address, as well as any possible size of data to be loaded. Thus, for example, byte address 810 might specify a particular address directly and indicate that one byte is to be loaded. Or, byte address 810 might include a base address for a block (or an identifier that may be mapped to the base address for that block), plus an offset from that base address, and a number of bytes to be loaded.

When RAID engine 135 receives store request 805, RAID engine 135 may determine if the stripe containing byte address 810 is currently loaded in buffer 615. If not, then RAID engine 135 may use read circuit 605 to read the stripe from storage devices 120 into buffer 615. If buffer 615 was previously full, RAID engine 135 may select a stripe to evict from buffer 615, as described with reference to FIG. 6 above.

As discussed with reference to FIG. 6 above, error handler 630 of FIG. 6 may be used to verify that data is correct when a stripe is loaded into buffer 615. If data 625, when read by read circuit 605 of FIG. 6, includes errors, error handler 630 of FIG. 6 may attempt to correct those errors before the stripe is fully loaded into buffer 615 (or may report a read failure if the error may not be corrected).

Once the stripe containing byte address 815 has been loaded into buffer 615, RAID engine 135 may update the stripe in buffer 615 using data 815. That is, one or more of data 625 may be updated using data 815. For example, if data 815 fits entirely within data 625-1, then data 625-1 may be updated. Alternatively, if data 815 is large enough that it spans across multiple data 625 (for example, if one portion of data 815 updates a portion of data 625-1 and another portion of data 815 updates a portion of data 625-2), then multiple data 625 may be updated by data 815. In addition, if the stripe including data 625-1 includes mirrored data or parity information, then data 625-2 and/or 625-3 might also be updated to account for data 815 updating data 625-1.

After RAID engine 135 has updated the data in the stripe in buffer 615, RAID engine 135 may then return result 820 back to application 305.

Since buffer 615 may now store data in a stripe that has not yet been written to storage devices 120, at some point RAID engine 135 may commit the changes to the stripe in buffer 615 to storage devices 120. Thus, at some point, RAID engine 135 may use write circuit 610 of FIG. 6 (and possibly error handler 630 of FIG. 6) to actually write the data in the updated stripe to storage devices 120.

In some embodiments of the disclosure, RAID engine 135 may use write circuit 610 of FIG. 6 to write the updated stripe in buffer 615 as soon as the data in the stripe in buffer 615 has been updated. In some embodiments of the disclosure, write circuit 610 of FIG. 6 may write the data in the update stripe to storage devices 120 before RAID engine 135 returns result 820 to application 305. In other embodiments of the disclosure, RAID engine 135 may return result 820 to application 305 (so that application 305 may continue execution), and then use write circuit 610 of FIG. 6 to write the data in the updated stripe to storage devices 120. In yet other embodiments of the disclosure, RAID engine 135 may delay using write circuit 610 of FIG. 6 to write the data to storage devices 120 until it is convenient to or necessary to write the data. For example, RAID engine 135 might wait until the utilization of storage devices 120 has diminished, so that the write commands issued to storage devices 120 may be executed with minimal (or no) impact to other processes that might be executing. Or, if the stripe containing the updated data is selected for eviction from buffer 615, RAID engine 135 might use write circuit 610 of FIG. 6 to write the data in the updated stripe to storage devices 120, as the write might not be delayed any longer. Note that if RAID engine 135 delays committing the updates to storage devices 120 until after RAID engine 135 sends result 820 back to application 305, buffer circuit 615 may need a backup power source to prevent against a power interruption causing data loss: if power is interrupted to buffer 615, RAID engine 135 may then ensure that any updated data (such as the stripe updated by store request 805) is written to storage devices 120 before such updates might be lost.

Note that all of the above discussion focuses on how RAID engine 135 may handle a byte level protocol request, rather than block level protocol requests. Embodiments of the disclosure effectively make block level protocol requests and byte level protocol requests equivalent, and both may be handled similarly. In other words, embodiments of the disclosure effectively convert byte level protocol requests into block level protocol requests (which enables accessing data using byte level protocol requests without bypassing the RAID implementation), with the conversion hidden from higher level processes such as application 305 of FIG. 3.

Figure 9:
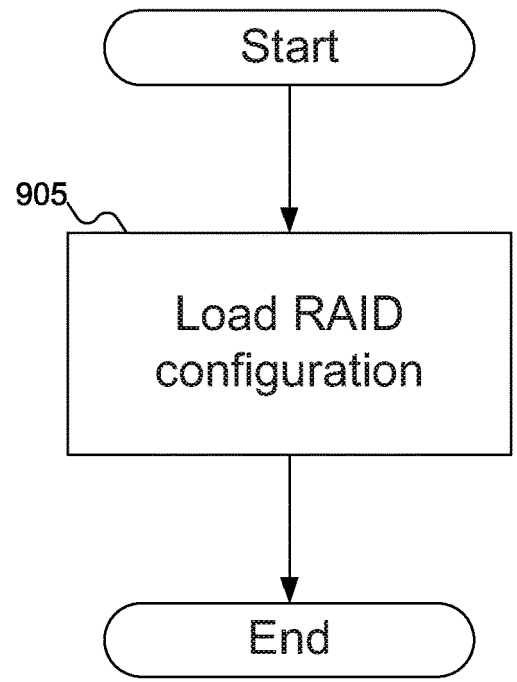
FIG. 9 shows a flowchart of an example procedure to load a RAID configuration as part of initialization of the RAID of FIG. 1, according to embodiments of the disclosure.

FIG. 9 shows a flowchart of an example procedure to load a RAID configuration as part of initialization of the RAID of FIG. 1, according to embodiments of the disclosure. At block 905, fabric manager 140 of FIG. 1 may load a RAID configuration. The RAID configuration may be stored in any desired non-volatile storage. For example, the RAID configuration may be stored on one of storage devices 120 of FIG. 1. Or, the RAID configuration may be stored in a local storage area, such as a non-volatile storage of fabric manager 140 of FIG. 1, RAID engine 140 of FIG. 1, or switch 145 of FIG. 1. Examples of such non-volatile storage may include NAND flash storage, a read-only memory (ROM), an programmable ROM (PROM), an erasable programmable ROM (EPROM), or an electrically erasable programmable ROM (EEPROM); other forms of non-volatile storage may also be used to store the RAID configuration.

Figure 10:
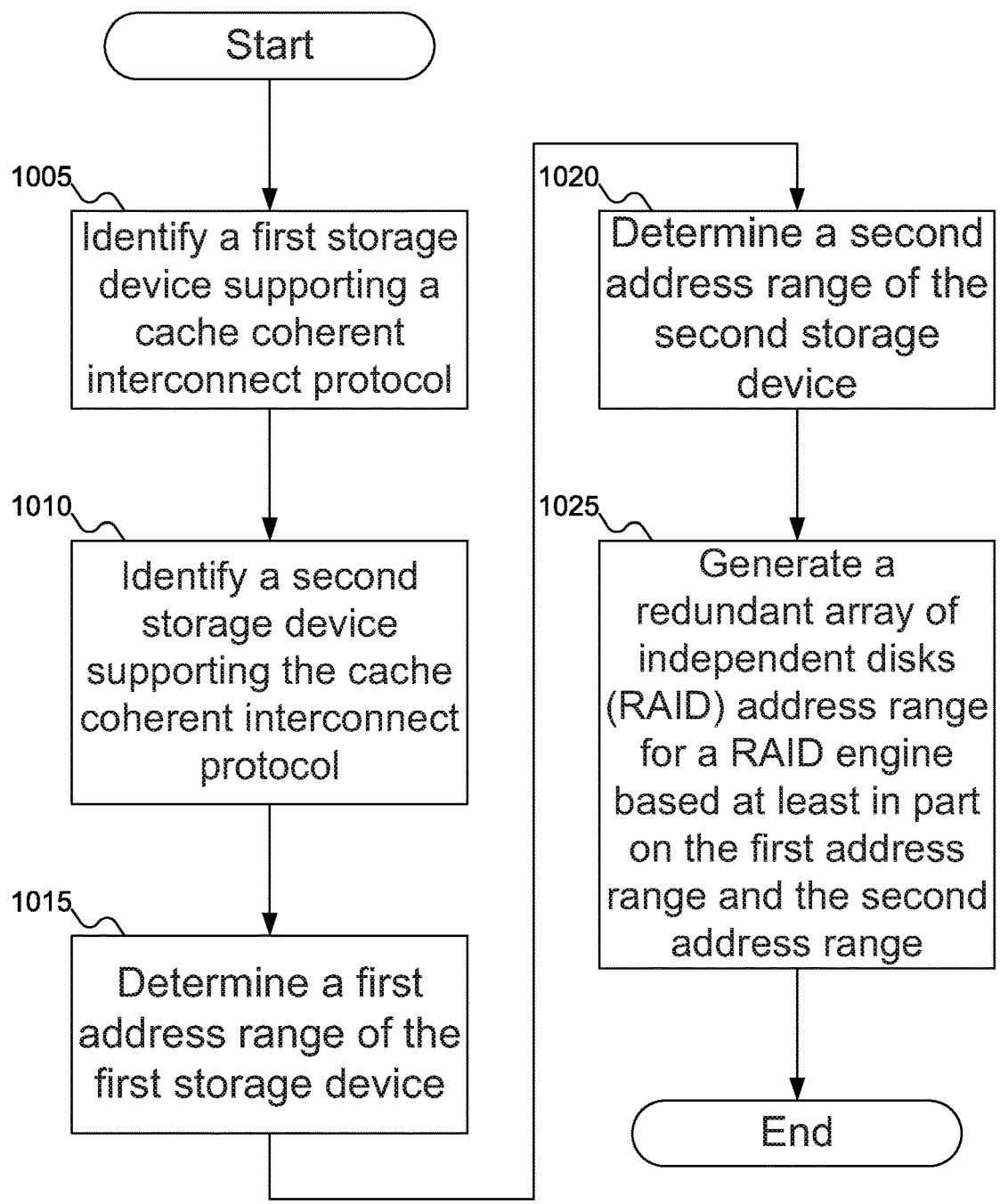
FIG. 10 shows a flowchart of an example procedure to perform initialization of the RAID of FIG. 1, according to embodiments of the disclosure.

FIG. 10 shows a flowchart of an example procedure to perform initialization of the RAID of FIG. 1, according to embodiments of the disclosure. In FIG. 10, at block 1005, fabric manager 140 of FIG. 1 may identify storage device 120-1 of FIG. 1 for inclusion in the RAID. As discussed above, storage device 120-1 of FIG. 1 may support a cache coherent interconnect protocol. Similarly, at block 1010, fabric manager 140 of FIG. 1 may identify storage device 120-2 of FIG. 1 for inclusion in the RAID. As discussed above, storage device 120-2 of FIG. 1 may support a cache coherent interconnect protocol.

At block 1015, fabric manager 140 of FIG. 1 may determine address range 505-1 of FIG. for storage device 120-1 of FIG. 1. At block 1020, fabric manager 140 of FIG. 1 may determine address range 505-2 of FIG. 5 for storage device 120-2 of FIG. 1. Finally, at block 1025, fabric manager 140 of FIG. 1 may generate RAID address range 510 of FIG. 5 based on address ranges 505 of FIG. 5.

Figure 11:
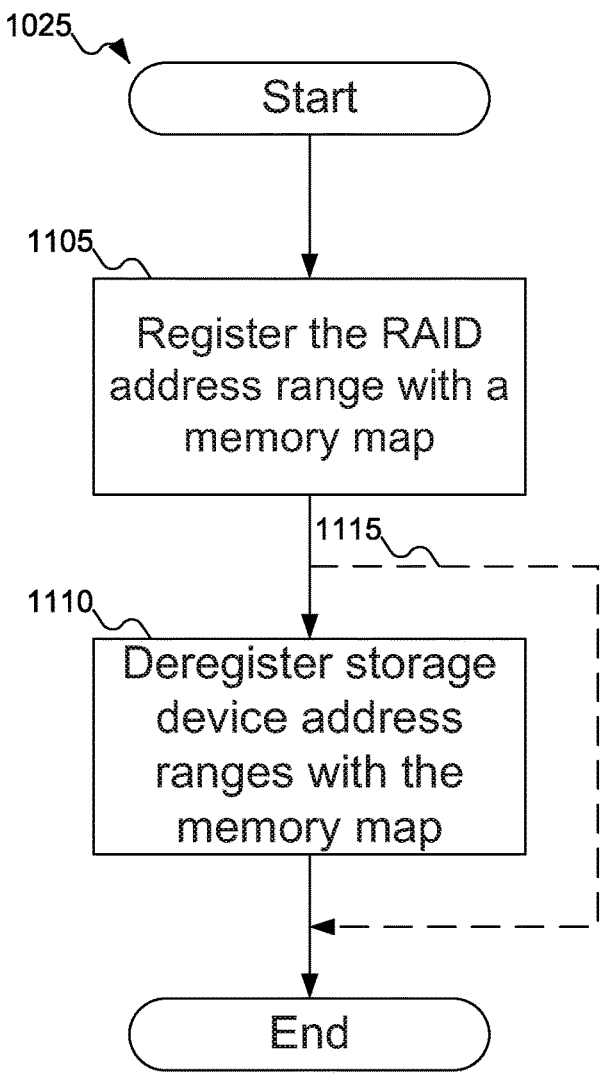
FIG. 11 shows a flowchart of an example procedure to manage the use of the RAID address range of FIG. 5, according to embodiments of the disclosure.

FIG. 11 shows a flowchart of an example procedure to manage the use of RAID address range 510 of FIG. 5, according to embodiments of the disclosure. In FIG. 11, at block 1105, fabric manager 140 of FIG. 1 may register RAID address range 510 of FIG. 5 with a memory map, so that machine 105 of FIG. 1 (more particularly, processes interacting with machine 105 of FIG. 1) may "see" RAID address range 510 of FIG. 5 as available for memory requests. At block 1110, if address ranges 505-1 and/or 505-2 of FIG. 5 were registered with the memory map of machine 105 of FIG. 1, fabric manager 140 of FIG. 1 may deregister address ranges 505 of FIG. 1 from the memory map of machine 105 of FIG. 1. Note that block 1110 may be omitted if address ranges 505 of FIG. 1 were not previously registered with the memory map of machine 105 of FIG. 1, as shown by dashed line 1115.

Figure 12:
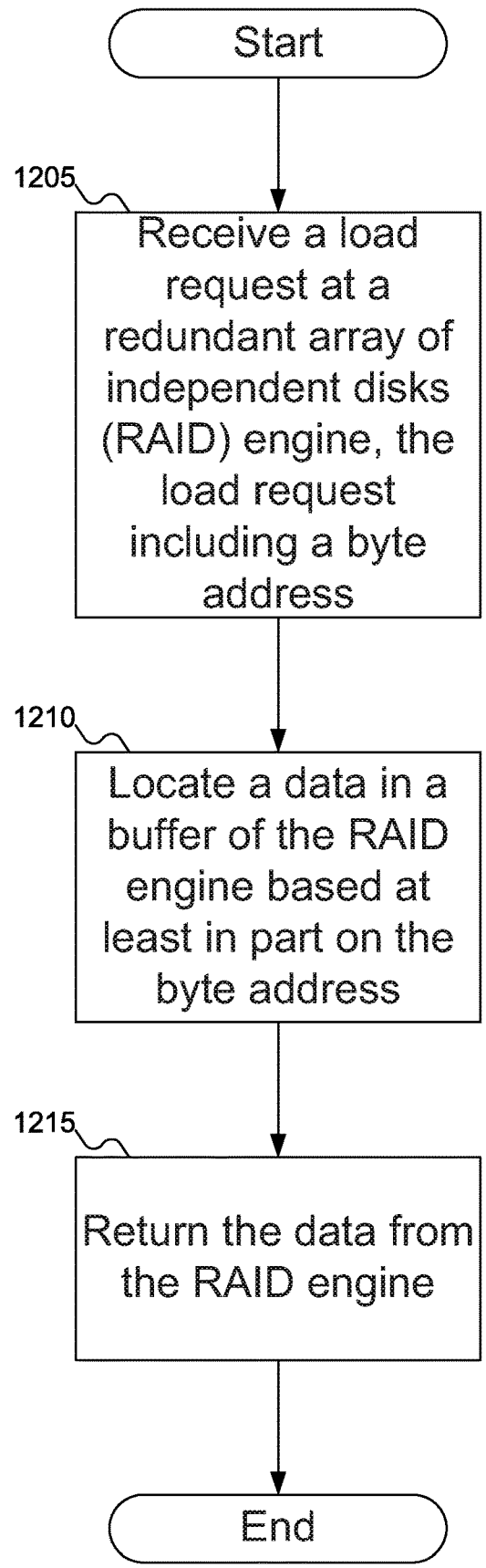
FIG. 12 shows a flowchart of an example procedure to process a load request using the RAID of FIG. 1, according to embodiments of the disclosure.

FIG. 12 shows a flowchart of an example procedure to process load request 705 using the RAID of FIG. 1, according to embodiments of the disclosure. In FIG. 12, at block 1205, RAID engine 135 of FIG. 1 may receive load request 705 of FIG. 7. As discussed with reference to FIG. 7 above, load request 705 of FIG. 7 may include byte address 710 of FIG. 7. At block 1210, RAID engine 135 of FIG. 1 may locate data in buffer 615 of FIG. 6 that is at byte address 710 of FIG. 7. Finally, at block 1215, RAID engine may return data 715 of FIG. 7, as extracted from buffer 615 of FIG. 6, to the process that issued load request 705 of FIG. 7.

Figure 13:
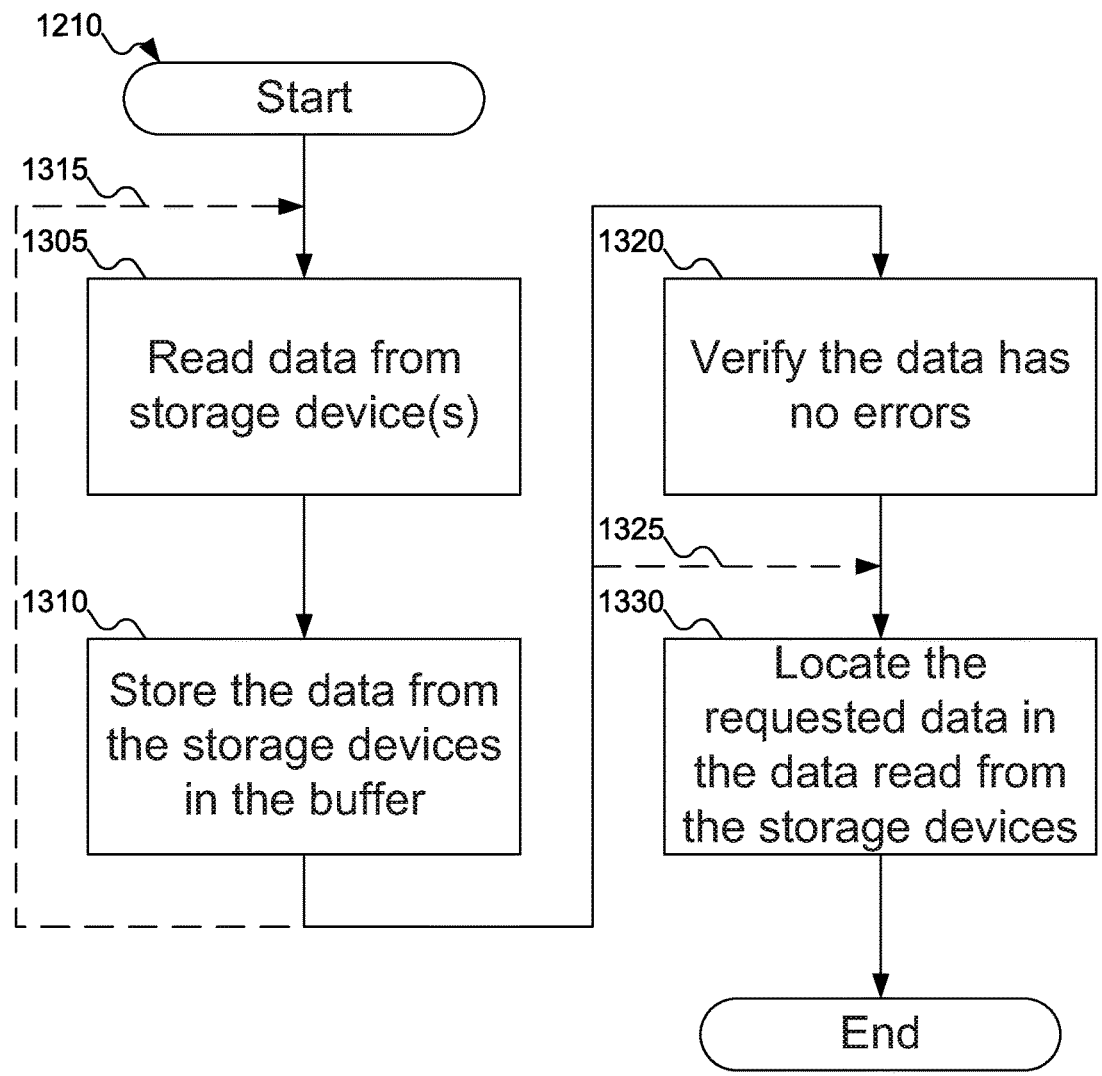
FIG. 13 shows a flowchart of an example procedure to locate the data requested in a load operation, according to embodiments of the disclosure.

FIG. 13 shows a flowchart of an example procedure to locate the data requested in load request 705 of FIG. 7, according to embodiments of the disclosure. At block 1305, read circuit 605 of FIG. 6 may read data 625 of FIG. 6 from storage devices 120 of FIG. 1, and at block 1310, RAID engine 135 of FIG. 1 may store data 625 of FIG. 6 as read from storage devices 120 in stripes 620 of FIG. 6 in buffer 615 of FIG. 6. Note that blocks 1305 and 1310 may be performed more than once, depending on what data is to be read from storage devices 120 of FIG. 1, as shown by dashed line 1315. At block 1320, error handler 630 of FIG. 6 may verify that the data read by read circuit 605 of FIG. 6 contains no errors (or corrects for any error detected, if possible). In some situations, error handling might not be performed: for example, in a RAID level 0 configuration, there is no redundancy that may be used to perform error correction. In such situations, block 1320 may be omitted, as shown by dashed line 1325. Finally, at block 1330, RAID engine 135 of FIG. 1 may locate the requested data in stripes 620 of FIG. 6 in buffer 615 of FIG. 6 using byte address 710 of FIG. 7.

Figure 14:
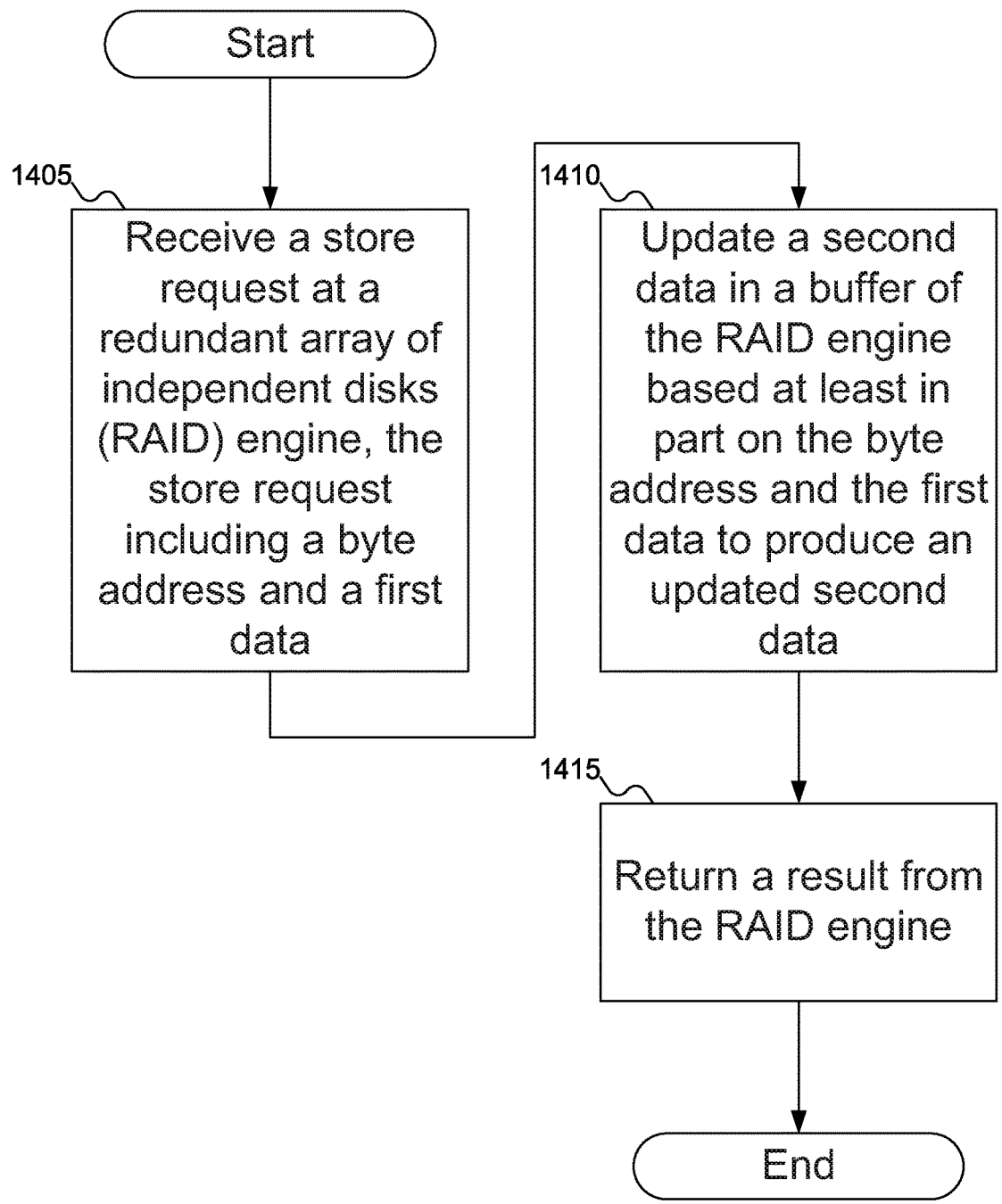
FIG. 14 shows a flowchart of an example procedure to process a store request using the RAID of FIG. 1, according to embodiments of the disclosure.

FIG. 14 shows a flowchart of an example procedure to process store request 805 of FIG. 8 using the RAID of FIG. 1, according to embodiments of the disclosure. In FIG. 14, at block 1405, RAID engine 135 of FIG. 1 may receive store request 805 of FIG. 8. As discussed with reference to FIG. 8 above, store request 805 of FIG. 8 may include data 815 of FIG. 8 and byte address 810 of FIG. 8 where data 815 of FIG. 8 is to be stored. At block 1410, RAID engine 135 of FIG. 1 may update stripe 620 of FIG. 6 in buffer 615 of FIG. 6 based on byte address 810 of FIG. 8 and data 815 of FIG. 8. At block 1410, RAID engine may also update other data in stripe 620 of FIG. 6 in buffer 615 of FIG. 6: for example, mirrored data and/or parity information may be updated as well. Finally, at block 1415, RAID engine 135 of FIG. 1 may return result 820 of FIG. 8 to the process that issued store request 805 of FIG. 8.

Figure 15:
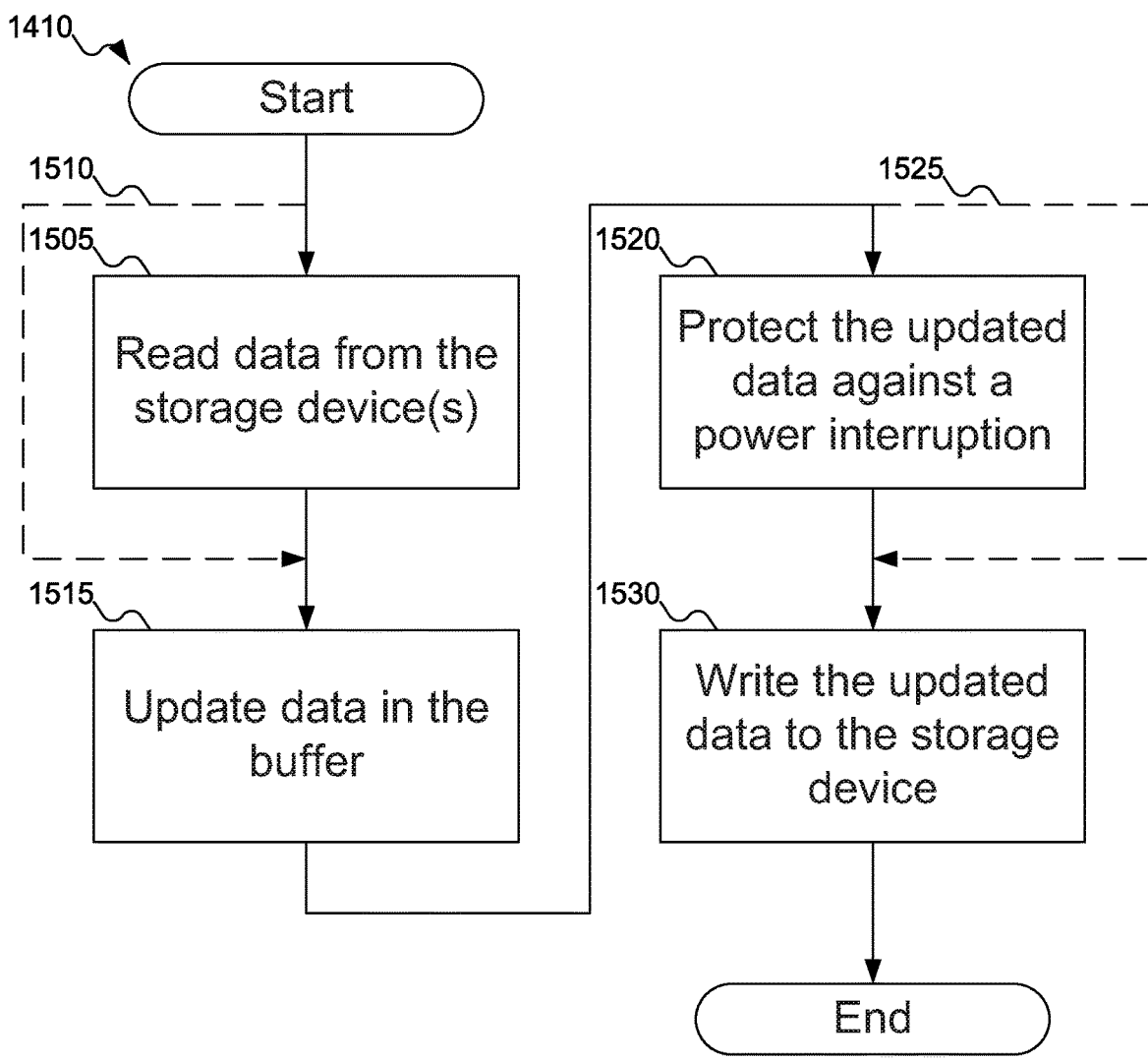
FIG. 15 shows a flowchart of an example procedure to handle storing data in the buffer of FIG. 6, according to embodiments of the disclosure.

FIG. 15 shows a flowchart of an example procedure to handle storing data in buffer 615 of FIG. 6, according to embodiments of the disclosure. In FIG. 15, at block 1505, read circuit 605 may read data 625 of FIG. 6 from storage devices 120 of FIG. 1 to store stripe 620 of FIG. 6 in buffer 615 of FIG. 6. Block 1505 may be omitted when stripe 620 of FIG. 6 containing the data to be updated is already loaded in buffer 615 of FIG. 6, as shown by dashed line 1510. At block 1515, RAID engine 135 of FIG. 1 may update the data in stripe 620 of FIG. 6 in buffer 615 of FIG. 6 based on byte address 810 of FIG. 8 and data 815 of FIG. 8. At block 1520, RAID engine 135 of FIG. 1 may protect the updated data against a power interruption. Such protection may be provided, for example, by a backup power source to ensure the data in buffer 615 of FIG. 6 may be written to storage devices 120. If store operation 805 of FIG. 8 is not considered complete until after the updated stripe in buffer 615 of FIG. 6 has been written to storage devices 120 of FIG. 1, then block 1520 may be omitted, as shown by dashed line 1525. Finally, at block 1530, which may be some time after RAID engine 135 of FIG. 6 updates the data in stripe 620 of FIG. 6 in buffer 615 of FIG. 6 as described in block 1515, write circuit 610 of FIG. 6 may write the updated data in stripe 620 of FIG. 6 in buffer 615 of FIG. 6 to storage devices 120 of FIG. 1.

In FIGS. 9-15, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a redundant array of independent disks (RAID) engine that may support processing byte level protocol requests for data stored on cache coherent interconnect protocol storage devices. The RAID engine may identify byte level protocol requests that access data on storage devices in a RAID configuration. Data may be loaded into a buffer, from which the specific data requested may be retrieved and returned. Embodiments of the disclosure provide a technical advantage over configurations that are not equipped to process byte level requests for data stored on storage devices that are included in a RAID configuration.

Compute Express Link (CXL) Solid State Drives (SSDs) may be exposed as a block device. The user may then use the CXL SSD as part of a Redundant Array of Independent Disks (RAID) using the CXL block device interface.

But if the CXL SSD is part of a RAID array, then there are potential problems. First, writing to an individual SSD in the RAID array might result in the data in the RAID array being unreadable. Second, if data is read from an individual SSD rather than as part of the RAID array, the data might not be checked using the parity offered by the RAID level used.

In addition, the CXL.mem (or CXL.memory) path does not support RAID by its own. Using software to map each individual CXL device in the RAID array and do checking in software is slow and involves a significant amount of software adaption.

To address these concerns, embodiments of the disclosure may include a hardware RAID engine 135 of FIG. 1 for the CXL.mem path. Using embodiments of the disclosure, software may be used to use the address range provided by hardware RAID engine.

Advantages of the embodiments of the disclosure include a way to support RAID in both CXL.mem path and CXL.io path and the ability to detect and recover CXL.mem path error using RAID feature. No application changes are needed, and there may be improved reliability in new architecture.

Embodiments of the disclosure support RAID configuration using CXL.mem path. Embodiments of the disclosure may reduce software complexity, and may avoid application changes or recompilation. In addition, reliability may be improved for applications that use CXL.mem. Finally, in some RAID configurations, performance may be improved by distributing traffic across devices.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
    a first storage device supporting a cache coherent interconnect protocol, the cache coherent interconnect protocol including a block level protocol and a byte level protocol;
    a second storage device supporting the cache coherent interconnect protocol; and
    a redundant array of independent disks (RAID) circuit communicating with the first storage device and the second storage device, the RAID circuit applying a RAID level to the first storage device and the second storage device, the RAID circuit configured to receive a request using the byte level protocol and to access data on the first storage device.

Statement 2. An embodiment of the disclosure includes the system according to statement 1, wherein the RAID circuit is configured to receive a request using the byte level protocol and to access data on the first storage device while maintaining the RAID level.

Statement 3. An embodiment of the disclosure includes the system according to statement 1, wherein the system further comprises a processor, the processor configured to issue the request sent to the RAID circuit.

Statement 4. An embodiment of the disclosure includes the system according to statement 1, wherein the cache coherent interconnect protocol includes a Compute Express Link (CXL) protocol.

Statement 5. An embodiment of the disclosure includes the system according to statement 1, wherein:
    the first storage device includes a first Solid State Drive (SSD) (120); and
    the second storage device includes a second SSD.

Statement 6. An embodiment of the disclosure includes the system according to statement 1, further comprising a cache coherent interconnect switch, wherein the cache coherent interconnect switch is connected to the first storage device, the second storage device, and the RAID circuit.

Statement 7. An embodiment of the disclosure includes the system according to statement 6, wherein the cache coherent interconnect switch includes the RAID circuit.

Statement 8. An embodiment of the disclosure includes the system according to statement 1, wherein the RAID circuit is configured to support at least one of RAID level 0, RAID level 1, RAID level 5, or RAID level 6.

Statement 9. An embodiment of the disclosure includes the system according to statement 1, wherein:

the system further comprises a circuit board including a first slot and a second slot;
the first storage device is installed in the first slot; and
the second storage device is installed in the second slot.

Statement 10. An embodiment of the disclosure includes the system according to statement 9, wherein:
the circuit board further includes a third slot; and
the RAID circuit is installed in the third slot.

Statement 11. An embodiment of the disclosure includes the system according to statement 10, further comprising a cache coherent interconnect switch, wherein the cache coherent interconnect switch is connected to the first storage device, the second storage device, and the RAID circuit, the cache coherent interconnect switch is installed in the third slot, and the cache coherent interconnect switch includes the RAID circuit.

Statement 12. An embodiment of the disclosure includes the system according to statement 10, wherein:
the circuit board further includes a fourth slot; and
the system further comprises a cache coherent interconnect switch, wherein the cache coherent interconnect switch is connected to the first storage device, the second storage device, and the RAID circuit, the cache coherent interconnect switch is installed in the fourth slot.

Statement 13. An embodiment of the disclosure includes the system according to statement 1, further comprising a fabric manager to configure the RAID circuit.

Statement 14. An embodiment of the disclosure includes the system according to statement 13, wherein the fabric manager is configured to identify the first storage device and the second storage device and configure the RAID circuit to use a RAID level.

Statement 15. An embodiment of the disclosure includes the system according to statement 13, wherein the fabric manager is configured to determine a first address range of the first storage device and a second address range of the second storage device and to map the first address range and the second address range to a RAID address range.

Statement 16. An embodiment of the disclosure includes the system according to statement 15, wherein the fabric manager is further configured to determine the RAID address range as accessible to a processor.

Statement 17. An embodiment of the disclosure includes the system according to statement 16, wherein the fabric manager is further configured to add the RAID address range to a memory map.

Statement 18. An embodiment of the disclosure includes the system according to statement 16, wherein the first address range and the second address range are hidden from the processor.

Statement 19. An embodiment of the disclosure includes the system according to statement 1, wherein the RAID circuit includes a buffer.

Statement 20. An embodiment of the disclosure includes the system according to statement 19, further comprising a backup power source configured to provide backup power to the buffer.

Statement 21. An embodiment of the disclosure includes the system according to statement 20, wherein the backup power source includes a battery or a capacitor.

Statement 22. An embodiment of the disclosure includes the system according to statement 19, wherein the RAID circuit is configured to return a data from the buffer based at least in part on a load request, the load request including a byte address.

Statement 23. An embodiment of the disclosure includes the system according to statement 22, wherein the load request includes a byte level protocol load request.

Statement 24. An embodiment of the disclosure includes the system according to statement 22, further comprising a processor, the processor configured to issue the load request sent to the RAID circuit.

Statement 25. An embodiment of the disclosure includes the system according to statement 22, wherein the RAID circuit further includes a read circuit, the read circuit configured to read a second data from the first storage device into the buffer and to read a third data from the second storage device into the buffer based at least in part on the byte address and a RAID level of the RAID circuit.

Statement 26. An embodiment of the disclosure includes the system according to statement 25, wherein the second data includes the data.

Statement 27. An embodiment of the disclosure includes the system according to statement 26, wherein:
the data includes a first part and a second part;
the second data includes the first part of the data; and
the third data includes the second part of the data.

Statement 28. An embodiment of the disclosure includes the system according to statement 25, wherein the RAID circuit further includes an error handler, the error handler configured to use a parity information in the third data to verify the second data.

Statement 29. An embodiment of the disclosure includes the system according to statement 19, wherein the RAID circuit is configured to write a data to the buffer based at least in part on a store request, the store request including a byte address and the data.

Statement 30. An embodiment of the disclosure includes the system according to statement 29, wherein the store request includes a byte level protocol store request.

Statement 31. An embodiment of the disclosure includes the system according to statement 29, further comprising a processor, the processor configured to issue the store request sent to the RAID circuit.

Statement 32. An embodiment of the disclosure includes the system according to statement 29, wherein the RAID circuit further includes a write circuit, the write circuit configured to write a second data from the buffer into the first storage device and to write a third data from the buffer into the second storage device based at least in part on the byte address and a RAID level of the RAID circuit.

Statement 33. An embodiment of the disclosure includes the system according to statement 32, wherein the RAID circuit further includes an error handler, the error handler configured to write a parity information in the third data to verify the second data.

Statement 34. An embodiment of the disclosure includes the system according to statement 29, wherein the RAID circuit further includes a read circuit, the read circuit configured to read a second data from the first storage device into the buffer and to read a third data from the second storage device into the buffer based at least in part on the byte address and a RAID level of the RAID circuit.

Statement 35. An embodiment of the disclosure includes the system according to statement 34, wherein the second data includes a fourth data to be replaced by the data.

Statement 36. An embodiment of the disclosure includes the system according to statement 34, wherein:
the data includes a first part and a second part;
the second data includes a fourth data to be replaced with the first part of the data; and the third data includes a fifth data to be replaced with the second part of the data.

Statement 37. An embodiment of the disclosure includes the system according to statement 34, wherein the RAID circuit further includes an error handler, the error handler configured to use a parity information in the third data to verify the second data.

Statement 38. An embodiment of the disclosure includes the system according to statement 1, further comprising a compute module, wherein the compute module is configured to access data from the first storage device or the second storage device through the RAID circuit.

Statement 39. An embodiment of the disclosure includes a method, comprising:
  identifying a first storage device supporting a cache coherent interconnect protocol;
  identifying a second storage device supporting the cache coherent interconnect protocol;
  determining a first address range of the first storage device;
  determining a second address range of the second storage device; and
  generating a redundant array of independent disks (RAID) address range for a RAID circuit based at least in part on the first address range and the second address range.

Statement 40. An embodiment of the disclosure includes the method according to statement 39, further comprising registering the RAID address range with a memory map of a system including the RAID circuit.

Statement 41. An embodiment of the disclosure includes the method according to statement 40, further comprising deregistering the first address range and the second address range with the memory map.

Statement 42. An embodiment of the disclosure includes the method according to statement 39, further comprising loading a RAID configuration from a non-volatile storage.

Statement 43. An embodiment of the disclosure includes a method, comprising:
  receiving a load request at a redundant array of independent disks (RAID) circuit, the load request including a byte address;
  locating a data in a buffer of the RAID circuit based at least in part on the byte address; and
  returning the data from the RAID circuit.

Statement 44. An embodiment of the disclosure includes the method according to statement 43, wherein the load request includes a byte level protocol load request.

Statement 45. An embodiment of the disclosure includes the method according to statement 43, wherein:
  receiving the load request at the RAID circuit includes receiving the load request at the RAID circuit from a processor; and
  returning the data from the RAID circuit includes returning the data from the RAID circuit to the processor.

Statement 46. An embodiment of the disclosure includes the method according to statement 43, wherein locating the data for the byte address in the buffer of the RAID circuit includes:
  reading a second data from a first storage device supporting a cache coherent interconnect protocol;
  reading a third data from a second storage device supporting a cache coherent interconnect protocol;
  storing the second data in the buffer; and
  storing the third data in the buffer.

Statement 47. An embodiment of the disclosure includes the method according to statement 46, wherein locating the data for the byte address in the buffer of the RAID circuit further includes locating the data in the second data.

Statement 48. An embodiment of the disclosure includes the method according to statement 47, wherein locating the data in the second data includes locating the byte address in an address range for the second data.

Statement 49. An embodiment of the disclosure includes the method according to statement 46, wherein:
  the data includes a first part and a second part;
  the second data includes the first part of the data; and
  the third data includes the second part of the data.

Statement 50. An embodiment of the disclosure includes the method according to statement 46, wherein locating the data for the byte address in the buffer of the RAID circuit further includes verifying the second data using a parity information in the third data.

Statement 51. An embodiment of the disclosure includes a method, comprising:
  receiving a store request at a redundant array of independent disks (RAID) circuit, the store request including a byte address and a first data;
  updating a second data in a buffer of the RAID circuit based at least in part on the byte address and the first data to produce an updated second data; and
  returning a result from the RAID circuit.

Statement 52. An embodiment of the disclosure includes the method according to statement 51, wherein the store request includes a byte level protocol store request.

Statement 53. An embodiment of the disclosure includes the method according to statement 51, wherein:
  receiving the store request at the RAID circuit includes receiving the load request at the RAID circuit from a processor; and
  returning the result from the RAID circuit includes returning the result from the RAID circuit to the processor.

Statement 54. An embodiment of the disclosure includes the method according to statement 51, further comprising writing the updated second data to a first storage device supporting a cache coherent interconnect protocol.

Statement 55. An embodiment of the disclosure includes the method according to statement 54, wherein writing the updated second data to the first storage device supporting the cache coherent interconnect protocol includes writing the updated second data to the first storage device supporting the cache coherent interconnect protocol based at least in part on returning a result from the RAID circuit.

Statement 56. An embodiment of the disclosure includes the method according to statement 55, wherein writing the updated second data to the first storage device supporting the cache coherent interconnect protocol based at least in part on returning a result from the RAID circuit includes protecting against a power interruption to the buffer using a backup power source.

Statement 57. An embodiment of the disclosure includes the method according to statement 51, further comprising:
  updating a third data in the buffer of the RAID circuit based at least in part on the first data to produce an updated third data; and
  writing the updated third data to a second storage device supporting the cache coherent interconnect protocol.

Statement 58. An embodiment of the disclosure includes the method according to statement 57, wherein updating the third data in the buffer of the RAID circuit based at least in part on the first data to produce the updated third data includes generating a parity information as the updated third data based at least in part on the first data.

Statement 59. An embodiment of the disclosure includes the method according to statement 57, further comprising reading the third data from the second storage device into the buffer.

Statement 60. An embodiment of the disclosure includes the method according to statement 51, further comprising reading the second data from the first storage device into the buffer.

Statement 61. An embodiment of the disclosure includes an article, comprising a non-transitory storage medium, the non-transitory storage medium having stored thereon instructions that, when executed by a machine, result in:
  identifying a first storage device supporting a cache coherent interconnect protocol;
  identifying a second storage device supporting the cache coherent interconnect protocol;
  determining a first address range of the first storage device;
  determining a second address range of the second storage device; and
  generating a redundant array of independent disks (RAID) address range for a RAID circuit based at least in part on the first address range and the second address range.

Statement 62. An embodiment of the disclosure includes the article according to statement 61, the non-transitory storage medium having stored thereon further instructions that, when executed by the machine, result in registering the RAID address range with a memory map of a system including the RAID circuit.

Statement 63. An embodiment of the disclosure includes the article according to statement 62, the non-transitory storage medium having stored thereon further instructions that, when executed by the machine, result in deregistering the first address range and the second address range with the memory map.

Statement 64. An embodiment of the disclosure includes the article according to statement 61, the non-transitory storage medium having stored thereon further instructions that, when executed by the machine, result in loading a RAID configuration from a non-volatile storage.

Statement 65. An embodiment of the disclosure includes an article, comprising a non-transitory storage medium, the non-transitory storage medium having stored thereon instructions that, when executed by a machine, result in:
  receiving a load request at a redundant array of independent disks (RAID) circuit, the load request including a byte address;
  locating a data in a buffer of the RAID circuit based at least in part on the byte address; and
  returning the data from the RAID circuit.

Statement 66. An embodiment of the disclosure includes the article according to statement 65, wherein the load request includes a byte level protocol load request.

Statement 67. An embodiment of the disclosure includes the article according to statement 65, wherein:
  receiving the load request at the RAID circuit includes receiving the load request at the RAID circuit from a processor; and
  returning the data from the RAID circuit includes returning the data from the RAID circuit to the processor.

Statement 68. An embodiment of the disclosure includes the article according to statement 65, wherein locating the data for the byte address in the buffer of the RAID circuit includes:
  reading a second data from a first storage device supporting a cache coherent interconnect protocol;
  reading a third data from a second storage device supporting a cache coherent interconnect protocol;
  storing the second data in the buffer; and
  storing the third data in the buffer.

Statement 69. An embodiment of the disclosure includes the article according to statement 68, wherein locating the data for the byte address in the buffer of the RAID circuit further includes locating the data in the second data.

Statement 70. An embodiment of the disclosure includes the article according to statement 69, wherein locating the data in the second data includes locating the byte address in an address range for the second data.

Statement 71. An embodiment of the disclosure includes the article according to statement 68, wherein:
  the data includes a first part and a second part;
  the second data includes the first part of the data; and
  the third data includes the second part of the data.

Statement 72. An embodiment of the disclosure includes the article according to statement 68, wherein locating the data for the byte address in the buffer of the RAID circuit further includes verifying the second data using a parity information in the third data.

Statement 73. An embodiment of the disclosure includes an article, comprising a non-transitory storage medium, the non-transitory storage medium having stored thereon instructions that, when executed by a machine, result in:
  receiving a store request at a redundant array of independent disks (RAID) circuit, the store request including a byte address and a first data;
  updating a second data in a buffer of the RAID circuit based at least in part on the byte address and the first data to produce an updated second data; and
  returning a result from the RAID circuit.

Statement 74. An embodiment of the disclosure includes the article according to statement 73, wherein the store request includes a byte level protocol store request.

Statement 75. An embodiment of the disclosure includes the article according to statement 73, wherein:
  receiving the store request at the RAID circuit includes receiving the load request at the RAID circuit from a processor; and
  returning the result from the RAID circuit includes returning the result from the RAID circuit to the processor.

Statement 76. An embodiment of the disclosure includes the article according to statement 73, the non-transitory storage medium having stored thereon further instructions that, when executed by the machine, result in writing the updated second data to a first storage device supporting a cache coherent interconnect protocol.

Statement 77. An embodiment of the disclosure includes the article according to statement 76, wherein writing the updated second data to the first storage device supporting the cache coherent interconnect protocol includes writing the updated second data to the first storage device supporting the cache coherent interconnect protocol based at least in part on returning a result from the RAID circuit.

Statement 78. An embodiment of the disclosure includes the article according to statement 77, wherein writing the updated second data to the first storage device supporting the cache coherent interconnect protocol based at least in part on returning a result from the RAID circuit includes protecting against a power interruption to the buffer using a backup power source.

Statement 79. An embodiment of the disclosure includes the article according to statement 73, the non-transitory storage medium having stored thereon further instructions that, when executed by the machine, result in:

updating a third data in the buffer of the RAID circuit based at least in part on the first data to produce an updated third data; and writing the updated third data to a second storage device supporting the cache coherent interconnect protocol.

Statement 80. An embodiment of the disclosure includes the article according to statement 79, wherein updating the third data in the buffer of the RAID circuit based at least in part on the first data to produce the updated third data includes generating a parity information as the updated third data based at least in part on the first data.

Statement 81. An embodiment of the disclosure includes the article according to statement 79, the non-transitory storage medium having stored thereon further instructions that, when executed by the machine, result in reading the third data from the second storage device into the buffer.

Statement 82. An embodiment of the disclosure includes the article according to statement 73, the non-transitory storage medium having stored thereon further instructions that, when executed by the machine, result in reading the second data from the first storage device into the buffer.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
   a first non-volatile storage device supporting a cache coherent interconnect protocol, the cache coherent interconnect protocol including a block level protocol and a byte level protocol;
   a second non-volatile storage device supporting the cache coherent interconnect protocol; and
   a redundant array of independent disks (RAID) circuit communicating with the first non-volatile storage device and the second non-volatile storage device, the RAID circuit applying a RAID level to stripe a first data across the first non-volatile storage device and the second non-volatile storage device, the RAID circuit configured to receive a request using the byte level protocol and to access a second data on the first non-volatile storage device.

2. The system according to claim 1, wherein the cache coherent interconnect protocol includes a Compute Express Link (CXL) protocol.

3. The system according to claim 1, further comprising a cache coherent interconnect switch, wherein the cache coherent interconnect switch is connected to the first non-volatile storage device, the second non-volatile storage device, and the RAID circuit.

4. The system according to claim 1, further comprising a fabric manager to configure the RAID circuit.

5. The system according to claim 4, wherein the fabric manager is configured to identify the first non-volatile storage device and the second non-volatile storage device and configure the RAID circuit to use a RAID level.

6. The system according to claim 4, wherein the fabric manager is configured to determine a first address range of the first non-volatile storage device and a second address range of the second non-volatile storage device and to map the first address range and the second address range to a RAID address range.

7. The system according to claim 6, wherein the fabric manager is further configured to determine the RAID address range as accessible to a processor.

8. The system according to claim 1, wherein the RAID circuit includes a buffer.

9. The system according to claim 8, further comprising a backup power source configured to provide backup power to the buffer.

10. The system according to claim 1, wherein the RAID circuit is configured to return a response based at least in part on the request.

11. The system according to claim 10, wherein:
    the request includes a load request using the byte level protocol to read the second data from the first non-volatile storage device; and
    the response includes the second data.

12. The system according to claim 10, wherein:
    the request includes a store request using the byte level protocol to write the second data to the first non-volatile storage device; and
    the response includes a completion response.

13. The system according to claim 8, wherein the buffer stores a first stripe of the first data across the first non-volatile storage device and the second non-volatile storage device.

* * * * *